(12) United States Patent
Purkayastha et al.

(10) Patent No.: US 12,507,312 B2
(45) Date of Patent: Dec. 23, 2025

(54) MULTIPLE SCG CONFIGURATIONS IN A RRC INACTIVE STATE

(71) Applicant: QUALCOMM Incorporated, San Diego, CA (US)

(72) Inventors: Punyaslok Purkayastha, San Diego, CA (US); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 440 days.

(21) Appl. No.: 18/152,724

(22) Filed: Jan. 10, 2023

(65) Prior Publication Data

US 2024/0237127 A1    Jul. 11, 2024

(51) Int. Cl.
*H04W 76/27* (2018.01)
*H04W 24/10* (2009.01)
*H04W 76/38* (2018.01)

(52) U.S. Cl.
CPC ........... *H04W 76/27* (2018.02); *H04W 24/10* (2013.01); *H04W 76/38* (2018.02)

(58) Field of Classification Search
CPC ...... H04W 76/27; H04W 76/38; H04W 24/10
See application file for complete search history.

(56) References Cited

U.S. PATENT DOCUMENTS

| | | | | |
|---|---|---|---|---|
| 2020/0288338 A1* | 9/2020 | Freda | .................... | H04W 24/10 |
| 2021/0152350 A1* | 5/2021 | Ai | .................... | H04W 76/19 |
| 2022/0312376 A1* | 9/2022 | Wu | .................... | H04W 68/04 |
| 2023/0120096 A1* | 4/2023 | Kim | .................... | H04W 76/19 370/329 |
| 2024/0430718 A1* | 12/2024 | Kawano | .................... | H04W 24/08 |
| 2025/0247197 A1* | 7/2025 | Kim | .................... | H04W 72/0457 |

FOREIGN PATENT DOCUMENTS

WO    WO-2020151735 A1 *   7/2020   ............ H04W 76/15

OTHER PUBLICATIONS

International Search Report and Written Opinion—PCT/US2023/083349—ISA/EPO—Mar. 11, 2024.
Qualcomm Incorporated: "Remaining Issues of NR Early Measurements", 3GPP TSG RAN WG2 Meeting #108, R2-1914380, 3rd Generation Partnership Project, Mobile Competence Centre, 650, Route Des Lucioles, F-06921 Sophia-Antipolis Cedex, France, vol. RAN WG2, No. Reno, Nevada, US, Nov. 18, 2019-Nov. 22, 2019, Nov. 8, 2019, pp. 1-12, XP051816464, The Whole Document.

* cited by examiner

*Primary Examiner* — Sujoy K Kundu
*Assistant Examiner* — Weibin Huang
(74) *Attorney, Agent, or Firm* — Procopio, Cory, Hargreaves & Savitch LLP

(57) ABSTRACT

Method and apparatus to configure a UE to store multiple SCG configurations while in a RRC inactive state. The apparatus requests, from each of one or more target nodes, a validity time for each of one or more candidate target SCG configurations for a UE. The apparatus transitions the UE to a RRC inactive state. The apparatus indicates the validity time for each of the one or more candidate target SCG configurations for each of the one or more target nodes.

27 Claims, 14 Drawing Sheets

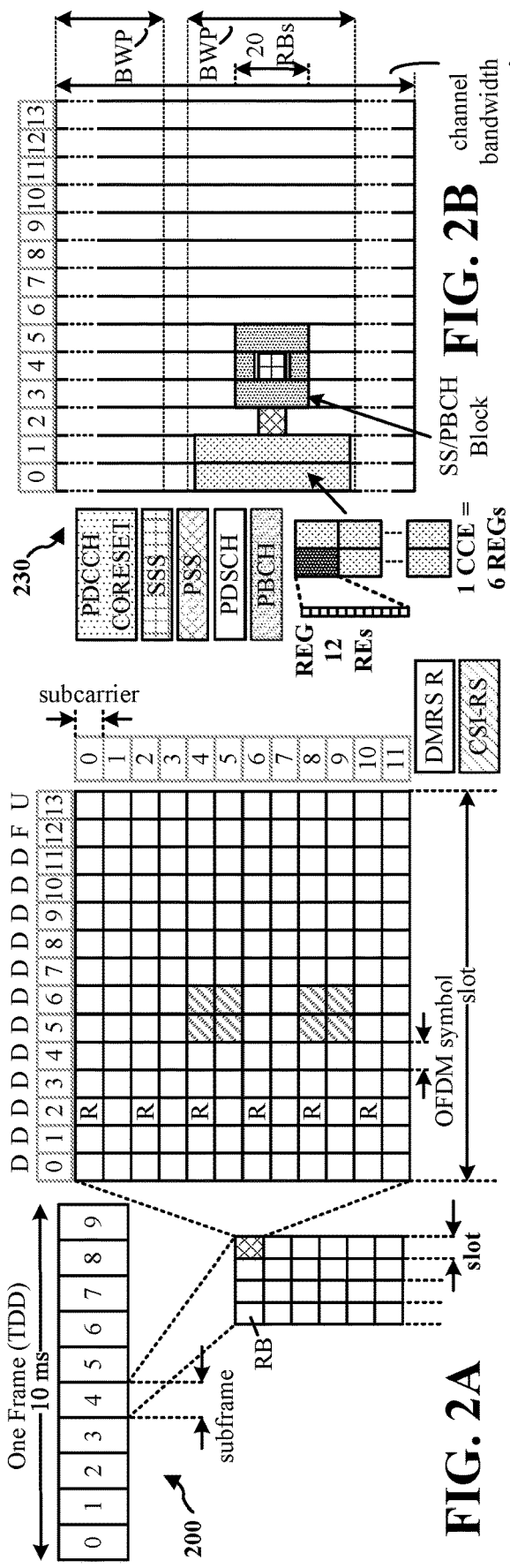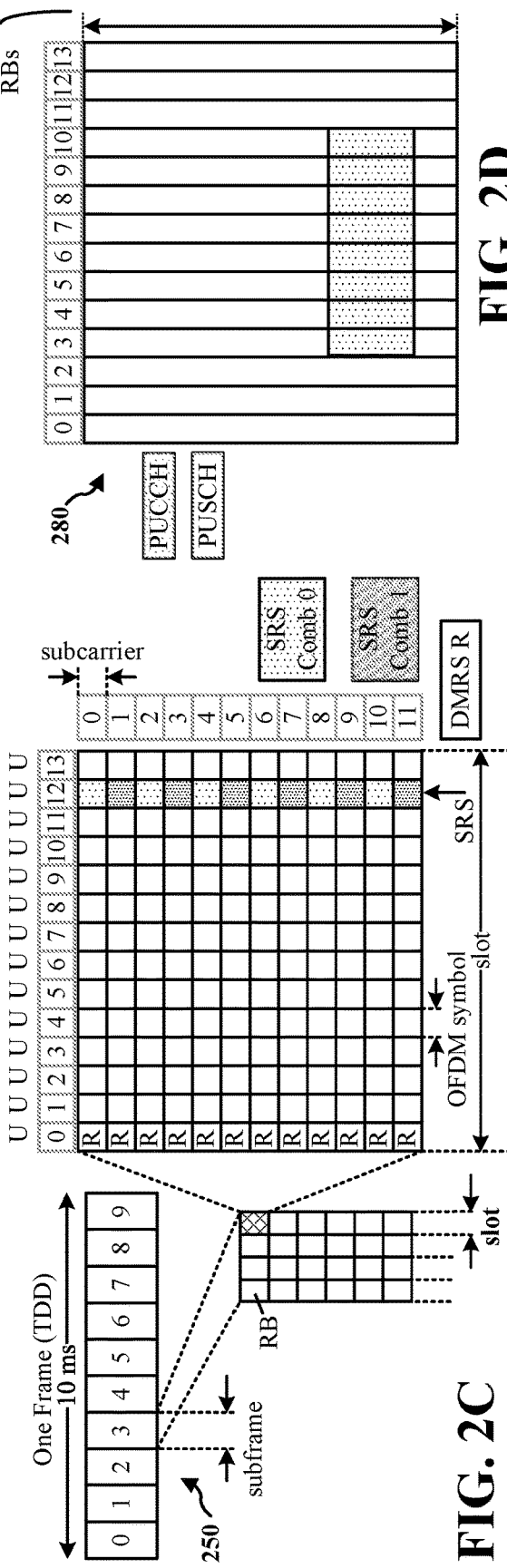
FIG. 2A  FIG. 2B  FIG. 2C  FIG. 2D

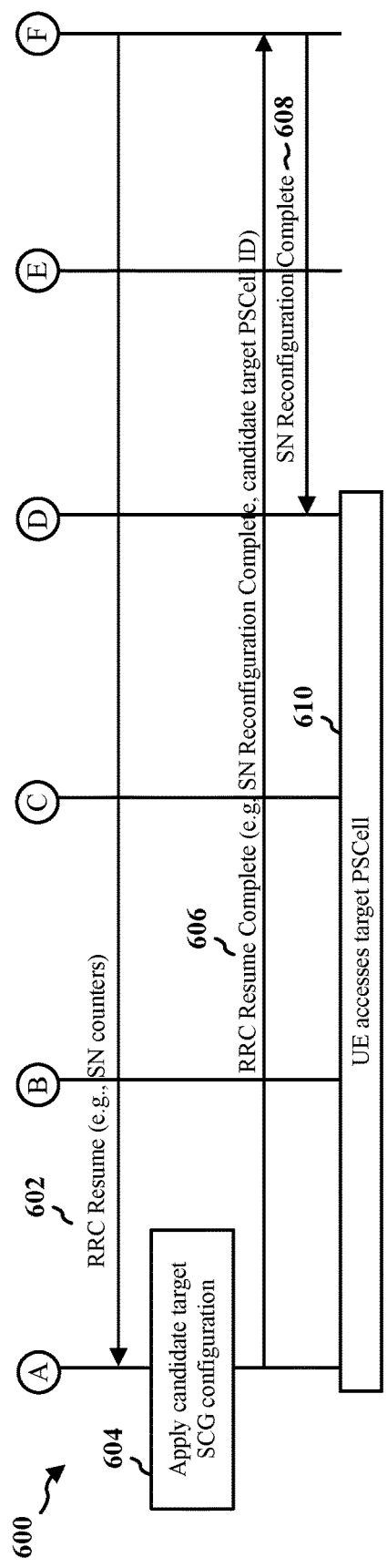
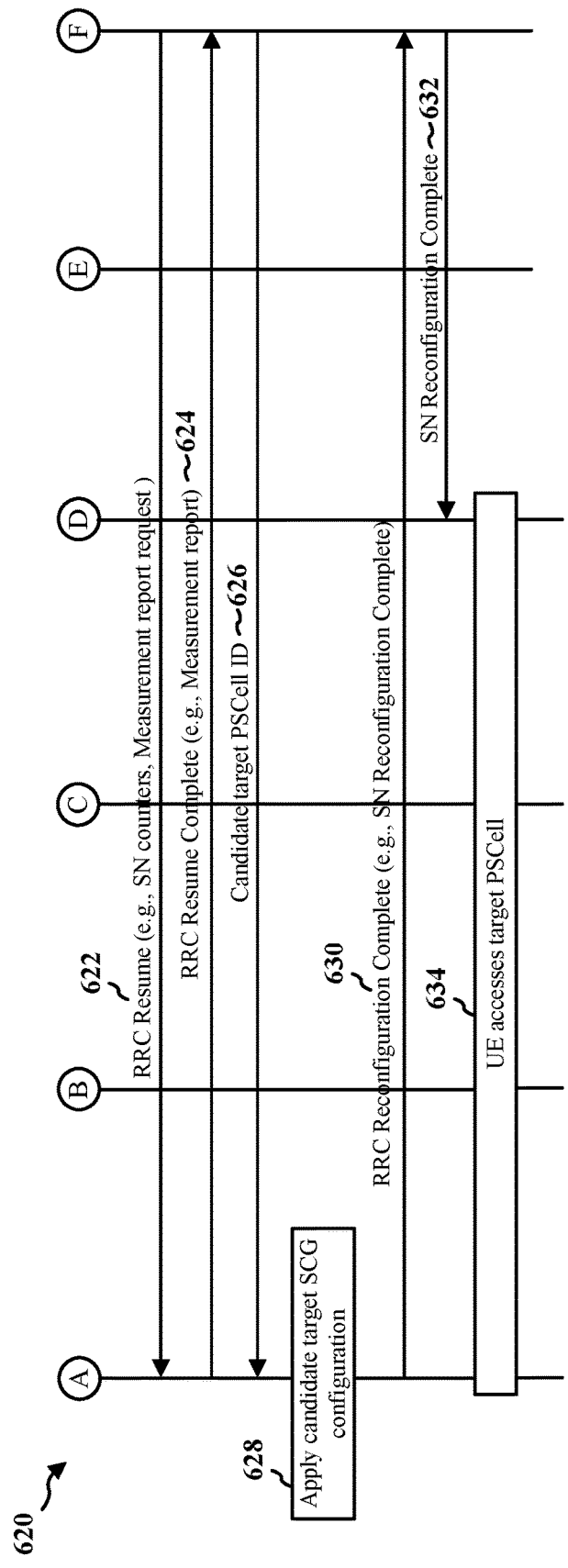
FIG. 6A
FIG. 6B

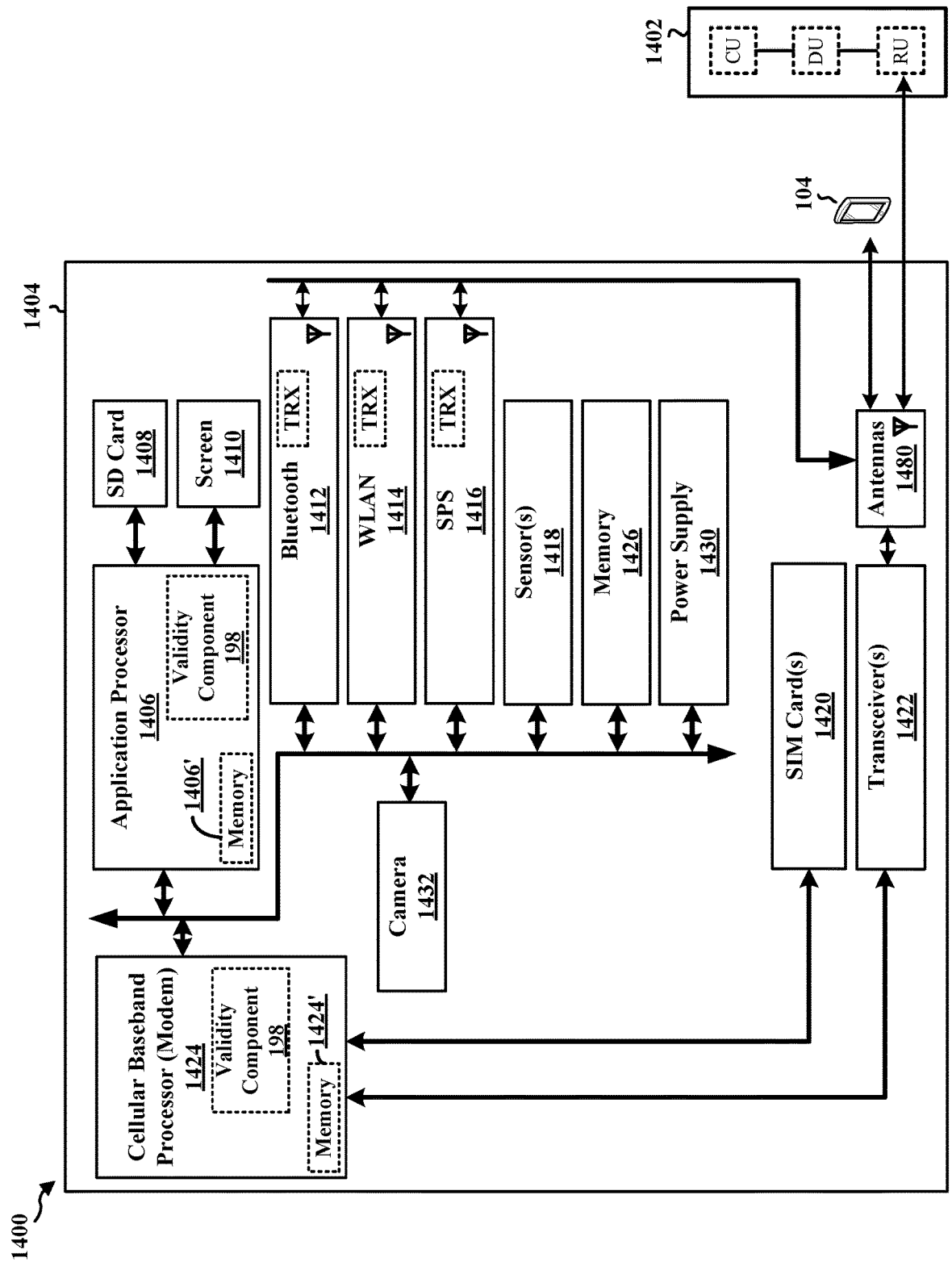

MULTIPLE SCG CONFIGURATIONS IN A RRC INACTIVE STATE

TECHNICAL FIELD

The present disclosure relates generally to communication systems, and more particularly, to a user equipment (UE) configured to store multiple secondary cell group (SCG) configurations while in a radio resource control (RRC) inactive state.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IOT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a UE. The device may be a processor and/or a modem at a UE or the UE itself. The apparatus receives an indication to transition to a radio resource control (RRC) inactive state and a validity time for each of one or more candidate target secondary cell group (SCG) configurations. The apparatus performs measurements for one or more candidate target primary secondary cells (PSCells) associated with the one or more candidate target SCG configurations during the RRC inactive state.

In an aspect of the disclosure, a method, a computer-readable medium, and an apparatus are provided. The apparatus may be a device at a network node. The device may be a processor and/or a modem at a network node or the network node itself. The apparatus requests, from each of one or more target nodes, a validity time for each of one or more candidate target secondary cell group (SCG) configurations for a user equipment (UE). The apparatus transitions the UE to a radio resource control (RRC) inactive state. The apparatus indicates the validity time for each of the one or more candidate target SCG configurations for each of the one or more target nodes.

In an aspect of the disclosure, a method, a computer-readable medium, and an apparatus are provided. The apparatus may be a device at a network node. The device may be a processor and/or a modem at a network node or the network node itself. The apparatus receives, from a primary node for a user equipment (UE), a request for a validity time for a candidate target secondary cell group (SCG) configuration for the UE. The apparatus provides the validity time for the candidate target SCG configuration for the UE to the primary node for the UE.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 2A is a diagram illustrating an example of a first frame, in accordance with various aspects of the present disclosure.

FIG. 2B is a diagram illustrating an example of downlink (DL) channels within a subframe, in accordance with various aspects of the present disclosure.

FIG. 2C is a diagram illustrating an example of a second frame, in accordance with various aspects of the present disclosure.

FIG. 2D is a diagram illustrating an example of uplink (UL) channels within a subframe, in accordance with various aspects of the present disclosure.

FIG. 6A is a call flow diagram of signaling between a UE and a second primary node.

FIG. 6B is a call flow diagram of signaling between a UE and a second primary node.

FIG. 14 is a diagram illustrating an example of a hardware implementation for an example apparatus and/or network entity

DETAILED DESCRIPTION

Figure 1:
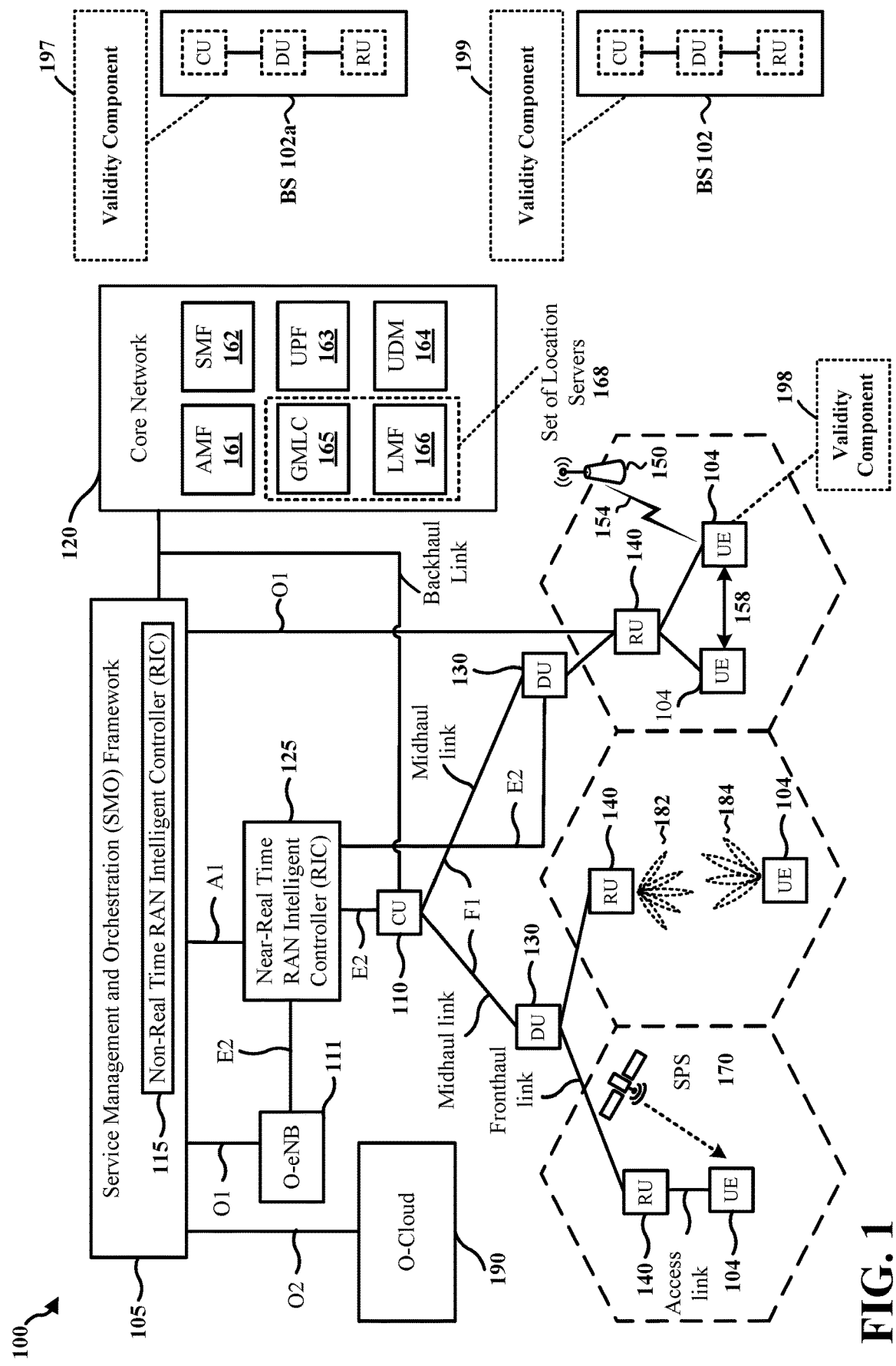
FIG. 1 is a diagram illustrating an example of a wireless communications system and an access network.

In wireless communication systems, dual connectivity (DC) allows for capable UEs in RRC CONNECTED mode to utilize resources, simultaneously, from two cell groups, namely, a cell group associated with a master node (MN) called a master cell group (MCG) and a cell group associated with a secondary node (SN) called a secondary cell group (SCG). The MN may be the base station or network entity that the UE is first connected to, while the SN is the subsequent base station or network entity that the UE may connect to. DC may allow UEs to be connected to the MCG via the MN and connected to the SCG via the SN.

Aspects presented herein provide a configuration for a UE configured to store multiple SCG configurations while in an RRC inactive state. At least one advantage of the UE storing multiple SCG configurations is that that upon resumption of the connection with the network, the UE may resume the DC operation in an efficient manner utilizing one of the stored SCG configurations.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (CNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUS)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit wireless signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-cNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHZ (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHZ-7.125 GHZ) and FR2 (24.25 GHz-52.6 GHz). Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHZ-71 GHZ), FR4 (71 GHz-114.25 GHZ), and FR5 (114.25 GHZ-300 GHz). Each of these higher frequency bands falls within the EHF band.

With the above aspects in mind, unless specifically stated otherwise, the term "sub-6 GHz" or the like if used herein may broadly represent frequencies that may be less than 6 GHZ, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may comprise a validity component 198 configured to receive an indication to transition to a radio resource control (RRC) inactive state and a validity time for each of one or more candidate target secondary cell group (SCG) configurations; and perform measurements for one or more candidate target primary secondary cells (PSCells) associated with the one or more candidate target SCG configurations during the RRC inactive state.

Referring again to FIG. 1, in certain aspects, the base station 102 may comprise a validity component 199 configured to request, from each of one or more target nodes, a validity time for each of one or more candidate target secondary cell group (SCG) configurations for a user equipment (UE); transition the UE to a radio resource control (RRC) inactive state; and indicate the validity time for each of the one or more candidate target SCG configurations for each of the one or more target nodes.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS $\Delta f = 2^\mu \cdot 15[\text{kHz}]$ | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
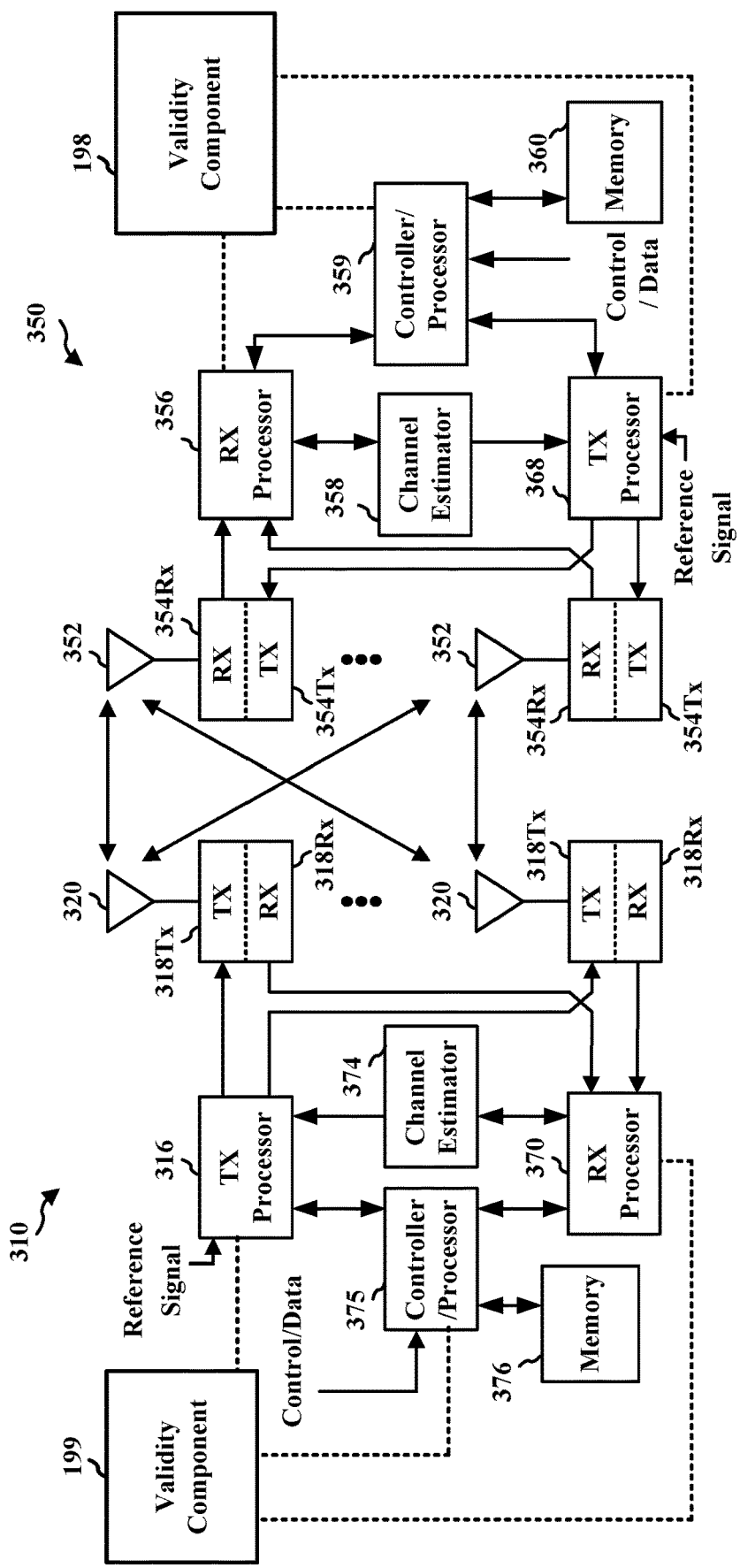
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the validity component 198 of FIG. 1.

At least one of the TX processor 316, the RX processor 370, and the controller/processor 375 may be configured to perform aspects in connection with the validity component 199 of FIG. 1.

In wireless communication systems, dual connectivity (DC) allows for capable UEs in RRC CONNECTED mode to utilize resources, simultaneously, from two cell groups, namely, a cell group associated with the MN called the MCG and a cell group associated with the SN called the SCG. The MN and/or the SN may comprise a base station or any other network node or network entity described herein. The UE may be connected to each of the MN and SN and send and/or receive data via both the MN and the SN. The MN may be the base station or network entity that the UE is first connected to, while the SN is the subsequent base station or network entity that the UE may connect to. DC may allow UEs to be connected to the MCG via the MN and connected to the SCG via the SN. Each of the MCG and the SCG may have a primary cell and may have a plurality of secondary cells. The primary cell of the MCG is the primary cell (PCell) and the primary cell of the SCG is the primary secondary cell (PSCell).

Aspects presented herein provide a configuration for a UE configured to store multiple SCG configurations while in an RRC inactive state. At least one advantage of the UE storing multiple SCG configurations is that upon resumption of the connection with the network, the UE may resume the DC operation in an efficient manner utilizing one of the stored SCG configurations. The UE may be configured with the multiple SCG configurations based on a conditional PSCell addition (CPA) procedure, a conditional PSCell change (CPC) procedure, or a SCG selective activation procedure.

Figure 4:
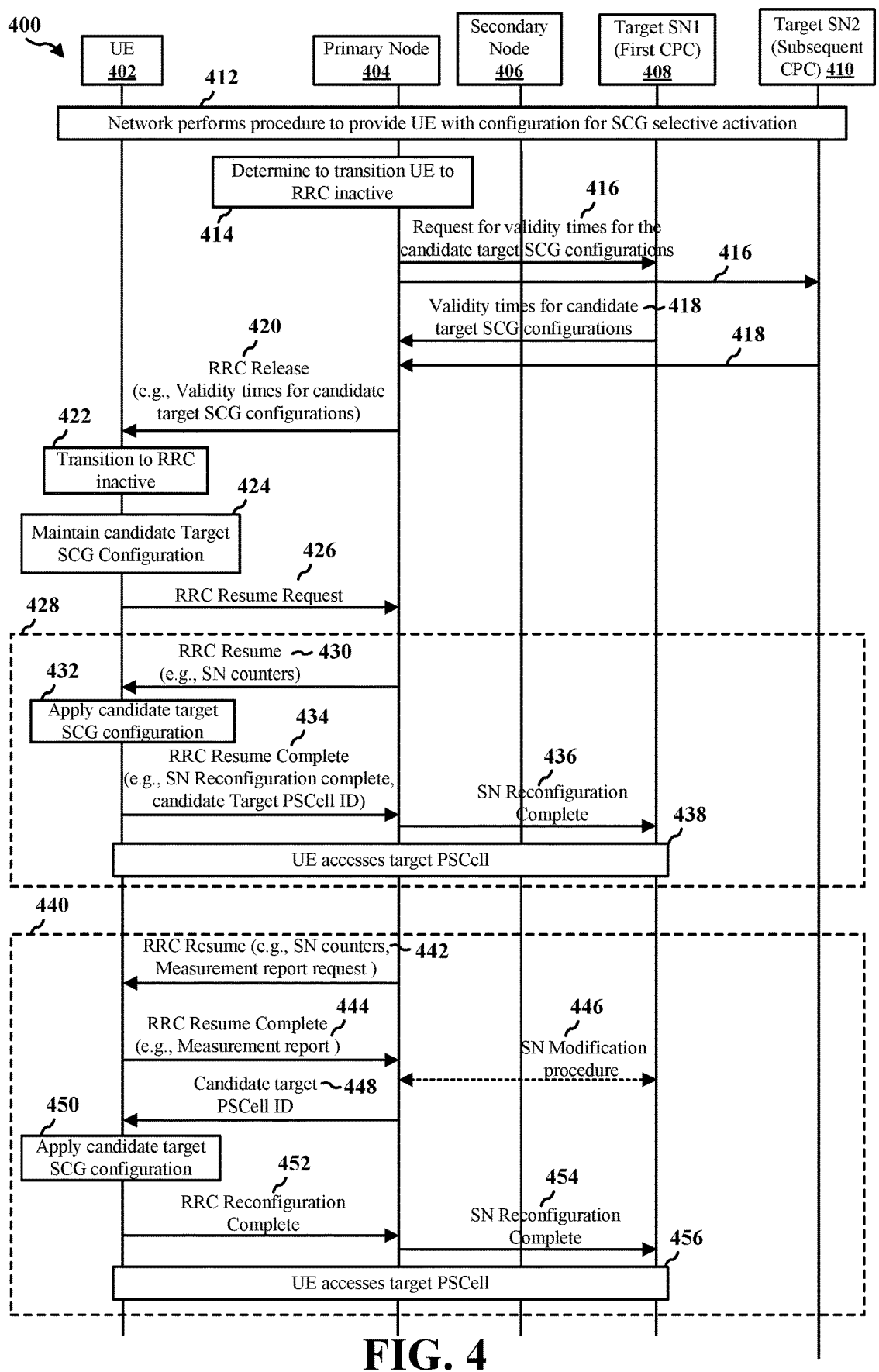
FIG. 4 is a call flow diagram of signaling between a UE and a primary node.

FIG. 4 is a call flow diagram 400 of signaling between a UE 402 and a primary node 404. The primary node 404 may be configured to provide at least one cell. The UE 402 may be configured to communicate with the primary node 404. For example, in the context of FIG. 1, the primary node 404 may correspond to base station 102 and the UE 402 may correspond to at least UE 104. In another example, in the context of FIG. 3, the primary node 404 may correspond to base station 310 and the UE 402 may correspond to UE 350. The diagram 400 further includes a secondary node (SN) 406, a target SN1 408, and a target SN2 410.

Diagram 400 shows the signaling flow for an instance where the UE resumes an RRC connection on the same primary node (e.g., MN). FIG. 4 includes an aspect where the candidate target PSCells belong to two target SNs (e.g., target SN1 and target SN2). The aspect of FIG. 4 includes an example of the target SN1 and target SN2 preparing the candidate target PSCells for the first and the subsequent CPC configurations, respectively.

At 412, the network may perform a procedure to provide the UE with a configuration for SCG selective activation. The UE 402 may receive the configuration for the SCG selective activation from the primary node 404. At 414, the primary node 404 may determine to transition the UE 402 to an RRC inactive state. For example, the primary node 404 may determine to transition the UE 402 into the RRC inactive state in instances where there is no traffic activity on the MCG or the SCG associated with the UE 402.

At 416, the primary node 404 may request a validity time for each of one or more candidate target SCG configuration for the UE. The primary node may request, from each of one or more target nodes (e.g., 408, 410), the validity time for each of the one or more target SCG configurations for the UE. Each of the one or more target nodes may obtain the request for the one or more candidate target SCG configurations from the primary node. The primary node may request the validity times for each of the one or more candidate target SCG configurations in instances where the primary node determines that the UE should maintain information regarding the candidate target PSCells and their associated SCG and MCG configurations. The validity time for a candidate target SCG configuration indicates the time for which the target SN can reserve the corresponding resources for the UE.

At 418, the primary node may obtain the validity time for each of the one or more candidate target SCG configurations for the UE. The primary node may obtain, from each of the one or more target nodes, the validity time for each of the one or more candidate target SCG configurations for the UE. Each of the one or more target nodes may provide, to the primary node, the respective validity time for each of the one or more candidate target SCG configurations for the UE. In some aspects, one or more of the one or more target nodes (e.g., 408, 410) may provide one or more candidate target SCG configurations for the UE.

At 420, the primary node may transition the UE 402 to an RRC inactive state. The primary node may transition the UE to the RRC inactive state if there is no traffic activity on the master cell group (MCG) or the SCG associated with the UE. The primary node may transition the UE to the RRC inactive state by providing an RRC release message to the UE. The UE may receive an indication to transition to the RRC inactive state. For example, the primary node may provide, to the UE, the RRC release message instructing the UE to transition to the RRC inactive state. The UE may receive the RRC release message from the primary node. The UE, at 422, may transition to the RRC inactive state in response to receiving the indication to transition to the RRC inactive state. In some aspects, the RRC release message may comprise the validity times for the candidate target SCG configurations for the UE. The validity time for the candidate target SCG configurations provided to the UE, by the primary nodes, may comprise the validity times obtained by the primary node from each of the one or more target nodes (e.g., 408, 410). The UE may receive the validity time for each of the candidate target SCG configurations from the primary node. In some aspects, the RRC release message may comprise a configuration for measurements to be performed while the UE is in the RRC inactive state. In some aspects, the primary node may determine the validity times for the associated MCG configurations and provide corresponding validity times based on the validity times for the associated SCG configurations obtained from the one or more target nodes. In some aspects, the RRC release message may comprise an early measurement configuration to configure the UE to perform measurements while in the RRC inactive state.

At 424, the UE, while in the RRC inactive state, may maintain a candidate target SCG configuration. The UE may maintain the candidate target SCG configuration until the associated validity time has expired. Upon expiration of the validity time, the UE may discard the candidate target SCG configuration. The UE may maintain the candidate target SCG configuration and an associated target MCG configuration for the duration of the validity time of the candidate target SCG configuration. In some aspects, the UE may perform measurements for one or more candidate target PSCells associated with the one or more candidate target SCG configurations. The UE may perform measurements for the one or more candidate target PSCells associated with the one or more candidate target SCG configurations during the RRC inactive state. For example, the UE may measure the one or more candidate target PSCells associated with the one or more target SCG configurations while the UE is in the RRC inactive state.

At 426, the UE may initiate a RRC resume procedure. For example, the UE may transmit, to the primary node, a RRC resume request. The primary node may obtain the RRC resume request from the UE. The UE may initiate the RRC resume procedure in instances where the UE has data to transmit, or in response to being paged by the network.

In some aspects, for example in 428, the UE may select a candidate target PSCell, based on measurements performed according to the early measurement configuration, from among those for which the validity time has not expired. For example, at 430, the primary node may provide, to the UE, a RRC resume indication. The UE may receive the RRC resume indication from the primary node. The RRC resume indication may comprise a security counter associated with a respective one of the one or more candidate target SCG configurations. The primary node may provide the security counter to the UE. The primary node may provide a security counter associated with a respective one of the one or more candidate target SCG configurations that corresponds to a candidate target primary secondary cell (PSCell) in response to a request to transition from the RRC inactive state to an RRC connected state. In some aspects, the security counter may be provided within a RRC resume indication to transition the UE from the RRC inactive state to the RRC connected state.

At 432, the UE may apply a candidate target SCG configuration. The UE may apply the candidate target SCG configuration based on the measurements obtained while performing measurements while in the RRC inactive state based on the early measurement configuration. The UE may select the candidate target PSCell from among those for which the validity time has not expired and based on the measurements obtained while performing measurements while in the RRC inactive state based on the early measurement configuration. The UE may also apply the corresponding candidate target SCG configuration and may derive an SN key to use based on the primary node key and the security counter.

At 434, the UE may transmit a RRC resume complete indication to the primary node. The primary node may obtain the RRC resume complete indication from the UE. The RRC resume complete indication may comprise a candidate target PSCell ID that identifies the candidate target PSCell selected by the UE for which the UE has resumed the RRC connection. The RRC resume complete indication may comprise a target node reconfiguration completion indication. At 436, the primary node, in response to obtaining the RRC resume complete indication from the UE, may provide the target node reconfiguration completion indication to the target node based on the indicated candidate target PSCell ID, provided by the UE. At 438, the UE may access the target PSCell and resume DC operation.

In some aspects, for example at 440, the primary node may select a candidate target PSCell based on measurements performed according to the early measurement configuration. For example, at 442, the primary node, in response to the RRC resume request obtained from the UE, may provide, to the UE, a RRC resume indication. The UE may receive the RRC resume indication from the primary node. The RRC resume indication may comprise a security counter associated with a respective one of the one or more candidate target SCG configurations. The primary node may provide the security counter to the UE. The primary node may provide a security counter associated with a respective one of the one or more candidate target SCG configurations that corresponds to a candidate target primary secondary cell (PSCell) in response to a request to transition from the RRC inactive state to an RRC connected state. In some aspects, the security counter may be provided within a RRC resume indication to transition the UE from the RRC inactive state to the RRC connected state. In some aspects, the RRC resume indication may comprise a measurement report request. The measurement report request may be for measurements conducted by the UE while in the RRC inactive state.

At 444, the UE may transmit a measurement report to the primary node. The primary node may obtain the measurement report from the UE. The measurement report may comprise measurements of one or more candidate target PSCells measured while the UE during the RRC inactive state. The UE may transmit the measurement report of the one or more candidate target PSCells based on measurements performed while the UE is in the RRC inactive state. The UE may transmit the measurement report to the primary node.

At 446, the primary node, based on the measurement report from the UE, may select a candidate target PSCell from those for which the validity time has not expired. The primary node may perform a target node modification procedure and notify the selected candidate target PSCell as being the selected candidate target PSCell for resumption with the UE.

At 448, the primary node may provide an ID of the candidate target PSCell for operation in the RRC connection state. The primary node may provide the ID of the candidate target PSCell for operation in the RRC connection state to the UE. The UE may receive the ID of the candidate target PSCell for operation in the RRC connection state from the primary node. The primary node may provide the ID of the candidate target PSCell for operation in the RRC connection state based on the measurement report. In some aspects, the primary node may provide the ID of the candidate target PSCell via layer 1 (L1) or layer 2 (L2) signaling or via RRC reconfiguration.

At 450, the UE may resume an RRC connection with the selected candidate target SCG configuration by applying the candidate target SCG configuration. The UE may resume the RRC connection with the selected candidate target SCG configuration associated with a received candidate target PSCell ID, from a set of the one or more candidate target SCG configurations for which the validity time has not expired. In such instances, the primary node may select the candidate target PSCell for operation in the RRC connected state based on the measurement report.

At 452, the UE may transmit, to the primary node, an indication of RRC reconfiguration complete, in response to applying the candidate target SCG configuration. The primary node may receive the indication of RRC reconfiguration complete from the UE. The primary node, at 454, may then provide the target node reconfiguration completion indication to the selected target node. At 456, the UE may access the target PSCell and resume DC operation.

Figure 5:
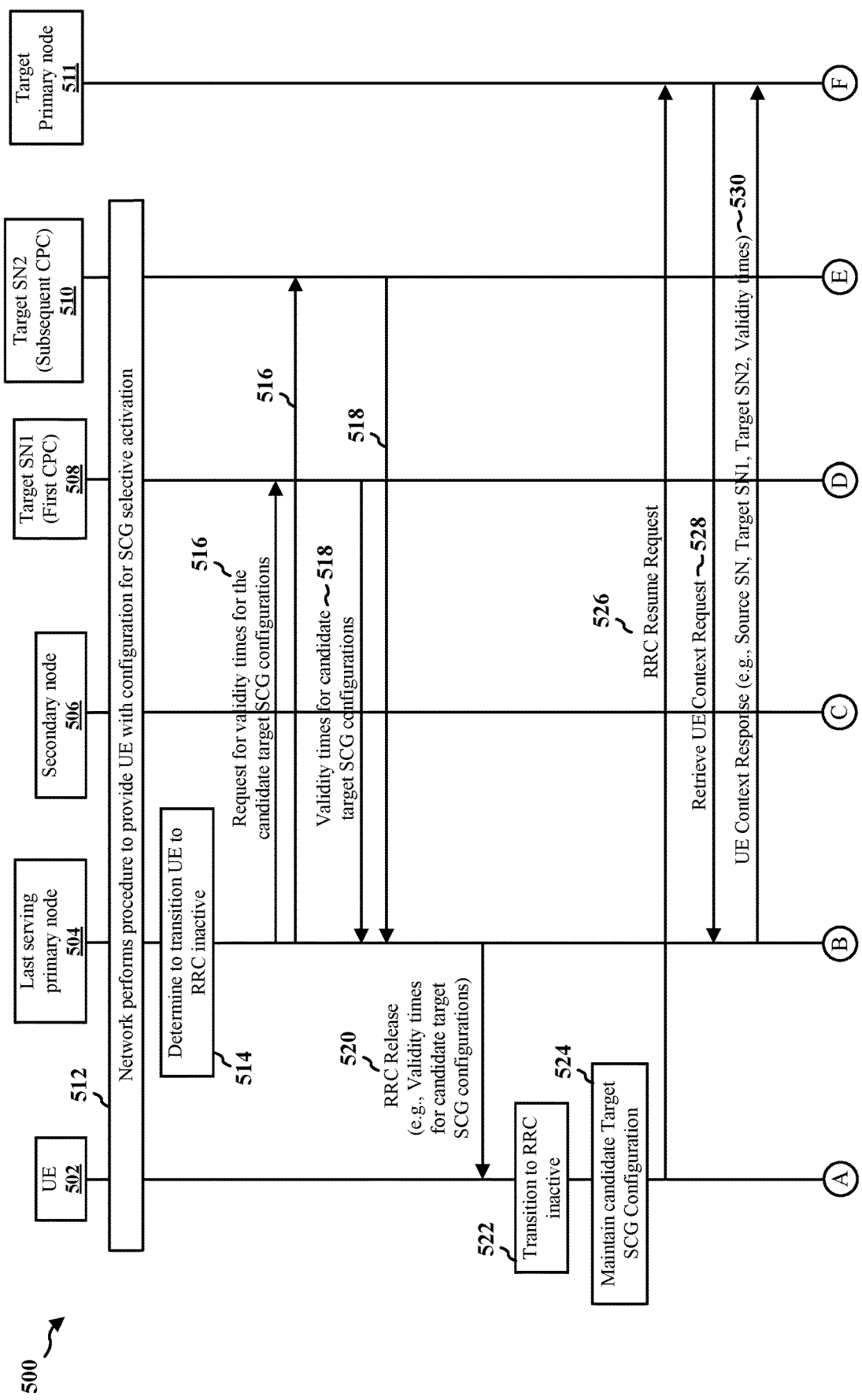
FIG. 5 is a call flow diagram of signaling between a UE and a primary node.

FIG. 5 is a call flow diagram 500 of signaling between a UE 502 and a primary node 504. The primary node 504 may be configured to provide at least one cell. The UE 502 may be configured to communicate with the primary node 504. For example, in the context of FIG. 1, the primary node 504 may correspond to base station 102 and the UE 502 may correspond to at least UE 104. In another example, in the context of FIG. 3, the primary node 504 may correspond to base station 310 and the UE 502 may correspond to UE 350. The diagram 500 further includes a secondary node (SN) 506, a target SB1 508, a target SN2 510, and a target primary node 511.

Diagram 500 shows the signaling flow for an instance where the UE resumes an RRC connection on a different primary node. The signaling flow is similar to the signaling flow of diagram 400 of FIG. 4. For example, the signaling of 412, 414, 416, 418, 420, 422, and 424 from FIG. 4 corresponds to the signaling of 512, 514, 516, 518, 520, 522, and 524 from FIG. 5, respectively, and are not reproduced herein in an effort to reduce duplicity. As such, the discussion of FIG. 5 will commence with respect to 526.

At 526, the UE may initiate a RRC resume procedure. For example, the UE may transmit a RRC resume request to a different primary node (e.g, 511) other than primary node 504. The different primary node may obtain the RRC resume request from the UE. The UE may initiate the RRC resume procedure in instances where the UE has data to transmit, or in response to being paged by the network. However, in the aspect of FIG. 5, the UE is resuming the RRC connection on a different primary node than the primary node that transitioned the UE into the RRC inactive state. The UE may request to resume the RRC connection on the different primary node in instances where the different primary node has a stronger signal or higher quality signal than the original primary node. The different primary node may have the stronger signal or the higher quality signal due, in part, to the mobility of the UE. For example, the UE may move away from the original primary node such that the different primary node provides an enhanced signal than that of the original primary node.

At 528, the different primary node may provide a second request for the UE context. The different primary node may provide the second request for the UE context to the original or last primary node 504. The original or last primary node 504 may obtain the second request for the UE context from the different primary node. The original or last primary node may obtain, from the different primary node in response to a first request to transition from the RRC inactive state to an RRC connected state, the second request for a UE context. In some aspects, the original or last primary node may comprise a last serving node and the UE requests to resume a connection with the different primary node.

At 530, the original or last primary node may provide, to the different primary node, the UE context. The UE context may comprise at least one of a source secondary node ID (e.g., 506), one or more target node IDs (e.g., 508, 510), and the validity times for each of the one or more candidate target SCG configurations associated with each of the one or more target nodes.

In some aspects, for example in diagram 600 of FIG. 6A, the UE may select a candidate target PSCell, based on measurements performed according to the early measurement configuration, from among those for which the validity time has not expired. For example, at 602, the different secondary node may provide, to the UE, a RRC resume indication. The UE may receive the RRC resume indication from the different primary node. The RRC resume indication may comprise a security counter associated with a respective one of the one or more candidate target SCG configurations. The different primary node may provide the security counter to the UE. The different primary node may provide a security counter associated with a respective one of the one or more candidate target SCG configurations that corresponds to a candidate target PSCell in response to a request to transition from the RRC inactive state to an RRC connected state. In some aspects, the security counter may be provided within a RRC resume indication to transition the UE from the RRC inactive state to the RRC connected state.

At 604, the UE may apply a candidate target SCG configuration. The UE may apply the candidate target SCG configuration based on the measurements obtained while performing measurements while in the RRC inactive state based on the early measurement configuration. The UE may select the candidate target PSCell from among those for which the validity time has not expired and based on the measurements obtained while performing measurements while in the RRC inactive state based on the early measurement configuration. The UE may also apply the corresponding candidate target SCG configuration and may derive an SN key to use based on the primary node key and the security counter.

At 606, the UE may transmit a RRC resume complete indication to the different primary node. The different primary node may obtain the RRC resume complete indication from the UE. The RRC resume complete indication may comprise a candidate target PSCell ID that identifies the candidate target PSCell selected by the UE for which the UE has resumed the RRC connection. The RRC resume complete indication may comprise a target node reconfiguration completion indication. At 608, the different primary node, in response to obtaining the RRC resume complete indication from the UE, may provide the target node reconfiguration completion indication to the target node based on the indicated candidate target PSCell ID, provided by the UE. At 610, the UE may access the target PSCell and resume DC operation.

In some aspects, for example in diagram 620 of FIG. 6B, the different primary node may select a candidate target PSCell based on measurements performed according to the early measurement configuration. For example, at 622, the different primary node, in response to the RRC resume request obtained from the UE, may provide, to the UE, a RRC resume indication. The UE may receive the RRC resume indication from the different primary node. The RRC resume indication may comprise a security counter associated with a respective one of the one or more candidate target SCG configurations. The different primary node may provide the security counter to the UE. The different primary node may provide a security counter associated with a respective one of the one or more candidate target SCG configurations that corresponds to a candidate target PSCell in response to a request to transition from the RRC inactive state to an RRC connected state. In some aspects, the security counter may be provided within a RRC resume indication to transition the UE from the RRC inactive state to the RRC connected state. In some aspects, the RRC resume indication may comprise a measurement report request. The measurement report request may be for measurements conducted by the UE while in the RRC inactive state.

At 624, the UE may transmit a measurement report to the different primary node. The different primary node may obtain the measurement report from the UE. The measurement report may comprise measurements of one or more candidate target PSCells measured while the UE during the RRC inactive state. The UE may transmit the measurement report of the one or more candidate target PSCells based on measurements performed while the UE is in the RRC inactive state. The UE may transmit the measurement report to the different primary node.

At 626, the different primary node may provide an ID of the candidate target PSCell for operation in the RRC connection state. The different primary node may provide the ID of the candidate target PSCell for operation in the RRC connection state to the UE. The UE may receive the ID of the candidate target PSCell for operation in the RRC connection state from the different primary node. The different primary node may provide the ID of the candidate target PSCell for operation in the RRC connection state based on the measurement report. In some aspects, the different primary node may select a candidate target PSCell from those for which the validity time has not expired based on the measurement report from the UE. In some aspects, the different primary node may perform a target node modification procedure and notify the selected candidate target PSCell as being the selected candidate target PSCell for resumption with the UE. In some aspects, the different primary node may provide the ID of the candidate target PSCell via layer 1 (L1) or layer 2 (L2) signaling or via RRC reconfiguration.

At 628, the UE may resume an RRC connection with the selected candidate target SCG configuration by applying the candidate target SCG configuration. The UE may resume the RRC connection with the selected candidate target SCG configuration associated with a received candidate target PSCell ID, from a set of the one or more candidate target SCG configurations for which the validity time has not expired. In such instances, the different primary node may select the candidate target PSCell for operation in the RRC connected state based on the measurement report.

At 630, the UE may transmit, to the different primary node, an indication of RRC reconfiguration complete, in response to applying the candidate target SCG configuration. The different primary node may receive the indication of RRC reconfiguration complete from the UE. The different primary node, at 632, may then provide the target node reconfiguration completion indication to the selected target node. At 634, the UE may access the target PSCell and resume DC operation.

Figure 7:
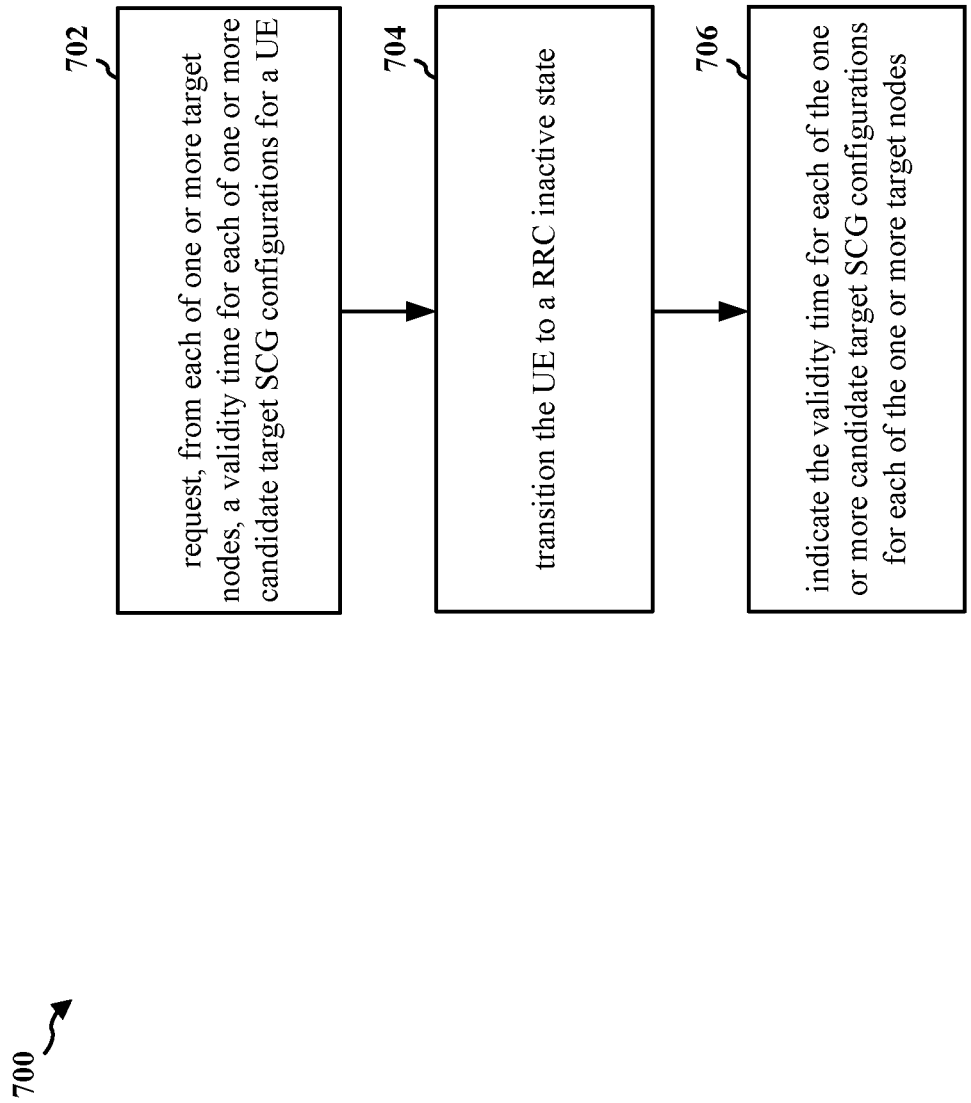
FIG. 7 is a flowchart of a method of wireless communication.

FIG. 7 is a flowchart 700 of a method of wireless communication at a primary node. The method may be performed by a base station (e.g., the base station 102; the network entity 902. One or more of the illustrated operations may be omitted, transposed, or contemporaneous. The method may configure a UE to store multiple SCG configurations while in an RRC inactive state to allow the UE to resume DC operation in an efficient manner based on one of the stored multiple SCG configurations.

At 702, the primary node may request a validity time for each of one or more candidate target SCG configuration for a UE, as shown in connection with FIG. 4 or 5. For example, 702 may be performed by validity component 199 of network entity 902. The primary node may request, from each of one or more target nodes, the validity time for each of the one or more target SCG configurations for the UE.

At 704, the primary node may determine to transition the UE to an RRC inactive state, as shown in connection with FIG. 4 or 5. For example, 704 may be performed by validity component 199 of network entity 902. The primary node may determine to transition the UE to the RRC inactive state if there is no traffic activity on the master cell group (MCG) or the SCG associated with the UE.

At 706, the primary node may indicate the validity time for each of the one or more candidate target SCG configurations for each of the one or more target nodes, as shown in connection with FIG. 4 or 5. For example, 706 may be performed by validity component 199 of network entity 902. The primary node may indicate, to the UE, the validity time for each of the one or more target SCG configurations. In some aspects, an indication comprising the validity time for each of the one or more candidate target SCG configurations for each of the one or more target nodes may be comprised within an RRC release indication. The RRC release indication may further comprise instructions to measure one or more candidate target primary secondary cells (PSCells) associated with the one or more candidate target SCG configurations during the RRC inactive state. The RRC release indication may be provided to the UE, by the primary node, such that the UE is informed of the validity time for each of the one or more candidate target SCG configurations for each of the one or more target nodes and may measure the one or more PSCells associated with the one or more candidate target SCG configurations while in the RRC inactive state.

Figure 8:
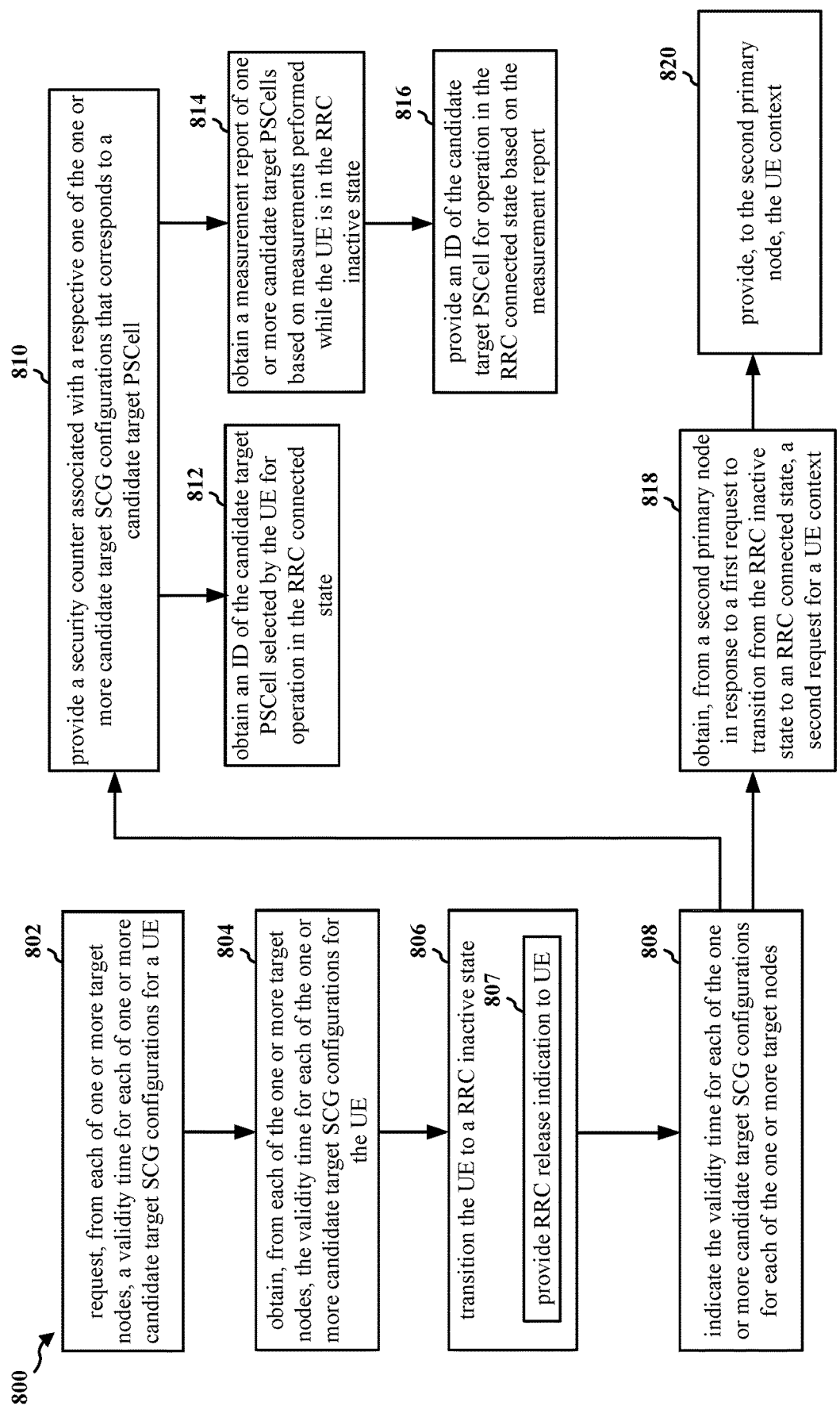
FIG. 8 is a flowchart of a method of wireless communication.

FIG. 8 is a flowchart 800 of a method of wireless communication. The method may be performed by a base station (e.g., the base station 102; the network entity 902. One or more of the illustrated operations may be omitted, transposed, or contemporaneous. The method may configure a UE to store multiple SCG configurations while in an RRC inactive state to allow the UE to resume DC operation in an efficient manner based on one of the stored multiple SCG configurations.

At 802, the primary node may request a validity time for each of one or more candidate target SCG configuration for a UE, as shown in connection with FIG. 4 or 5. For example, 802 may be performed by validity component 199 of network entity 902. The primary node may request, from each of one or more target nodes, the validity time for each of the one or more target SCG configurations for the UE.

At 804, the primary node may obtain the validity time for each of the one or more candidate target SCG configurations for the UE, as shown in connection with FIG. 4 or 5. For example, 804 may be performed by validity component 199 of network entity 902. The primary node may obtain, from each of the one or more target nodes, the validity time for each of the one or more candidate target SCG configurations for the UE.

At 806, the primary node may determine to transition the UE to an RRC inactive state, as shown in connection with FIG. 4 or 5. For example, 806 may be performed by validity component 199 of network entity 902. The primary node may determine to transition the UE to the RRC inactive state if there is no traffic activity on the master cell group (MCG) or the SCG associated with the UE. In some aspects, upon the determination to transition the UE to the RRC inactive state, the primary node, at 807, may provide, to the UE, an RRC release indication, as shown in connection with FIG. 4 or 5.

At 808, the primary node may indicate the validity time for each of the one or more candidate target SCG configurations for each of the one or more target nodes, as shown in connection with FIG. 4 or 5. For example, 808 may be performed by validity component 199 of network entity 902. The primary node may indicate, to the UE, the validity time for each of the one or more target SCG configurations. In some aspects, an indication comprising the validity time for each of the one or more candidate target SCG configurations for each of the one or more target nodes may be comprised within the RRC release indication. The RRC release indication may further comprise instructions to measure one or more candidate target primary secondary cells (PSCells) associated with the one or more candidate target SCG configurations during the RRC inactive state. The RRC release indication may be provided to the UE, by the primary node, such that the UE is informed of the validity time for each of the one or more candidate target SCG configurations for each of the one or more target nodes and may measure the one or more PSCells associated with the one or more candidate target SCG configurations while in the RRC inactive state.

At 810, the primary node may provide a security counter associated with a respective one of the one or more candidate target SCG configurations, as shown in connection with FIG. 4. For example, 810 may be performed by validity component 199 of network entity 902. The primary node may provide the security counter to the UE. The primary node may provide a security counter associated with a respective one of the one or more candidate target SCG configurations that corresponds to a candidate target primary secondary cell (PSCell) in response to a request to transition from the RRC inactive state to an RRC connected state. The UE may transmit to the primary node the request to transition from the RRC inactive state to the RRC connected state. In some aspects, the security counter may be provided within a RRC resume indication to transition the UE from the RRC inactive state to the RRC connected state.

At 812, the primary node may obtain an ID of the candidate target PSCell, as shown in connection with FIG. 4. For example, 812 may be performed by validity component 199 of network entity 902. The primary node may obtain the ID of the candidate target PSCell selected by the UE for operation in the RRC connected state.

At 814, the primary node may obtain a measurement report of one or more candidate target PSCells, as shown in connection with FIG. 4. For example, 814 may be performed by validity component 199 of network entity 902. The primary node may obtain the measurement report of the one or more candidate target PSCells based on measurements performed while the UE is in the RRC inactive state.

At 816, the primary node may provide an ID of the candidate target PSCell for operation in the RRC connection state, as shown in connection with FIG. 4. For example, 816 may be performed by validity component 199 of network entity 902. The primary node may provide the ID of the candidate target PSCell for operation in the RRC connection state based on the measurement report. The measurement report comprising measurements of the one or more candidate target PSCells while the UE is in the RRC inactive state.

At 818, the primary node may obtain a second request for a UE context, as shown in connection with FIG. 5. For example, 818 may be performed by validity component 199 of network entity 902. The primary node may obtain, from a second primary node in response to a first request to transition from the RRC inactive state to an RRC connected state, the second request for a UE context. In some aspects, the primary node may comprise a last serving node and the UE requests to resume a connection with the second primary node.

At 820, the primary node may provide, to the second primary node, the UE context, as shown in connection with FIG. 5. For example, 820 may be performed by validity component 199 of network entity 902. The UE context may comprise at least one of a source secondary node ID, one or more target node IDs, and the validity times for each of the one or more candidate target SCG configurations associated with each of the one or more target nodes.

Figure 9:
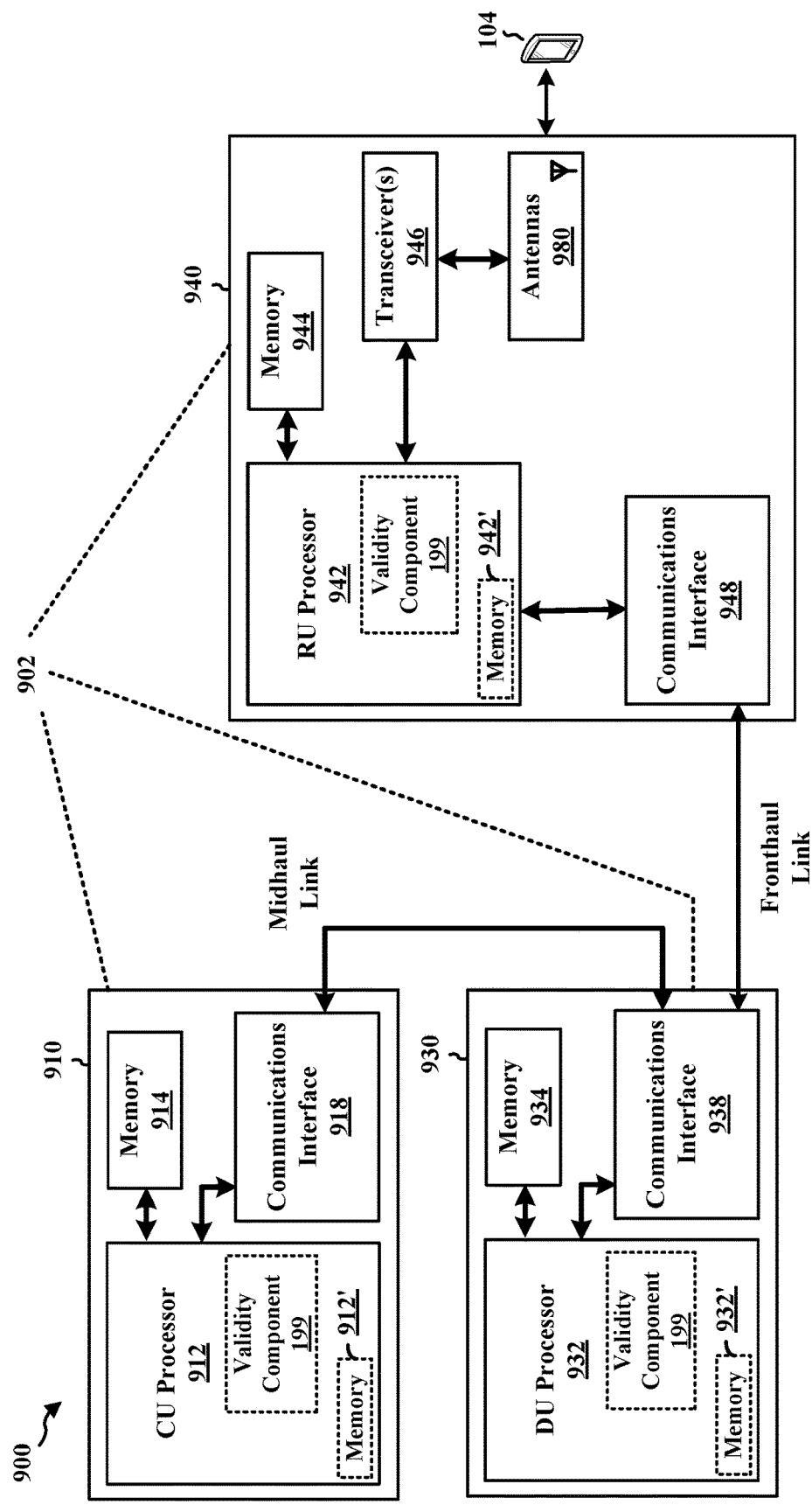
FIG. 9 is a diagram illustrating an example of a hardware implementation for an example network entity.

FIG. 9 is a diagram 900 illustrating an example of a hardware implementation for a network entity 902. The network entity 902 may be a BS, a component of a BS, or may implement BS functionality. The network entity 902 may include at least one of a CU 910, a DU 930, or an RU 940. For example, depending on the layer functionality handled by the component 199, the network entity 902 may include the CU 910; both the CU 910 and the DU 930; each of the CU 910, the DU 930, and the RU 940; the DU 930; both the DU 930 and the RU 940; or the RU 940. The CU 910 may include a CU processor 912. The CU processor 912 may include on-chip memory 912'. In some aspects, the CU 910 may further include additional memory modules 914 and a communications interface 918. The CU 910 communicates with the DU 930 through a midhaul link, such as an F1 interface. The DU 930 may include a DU processor 932. The DU processor 932 may include on-chip memory 932'. In some aspects, the DU 930 may further include additional memory modules 934 and a communications interface 938. The DU 930 communicates with the RU 940 through a fronthaul link. The RU 940 may include an RU processor 942. The RU processor 942 may include on-chip memory 942'. In some aspects, the RU 940 may further include additional memory modules 944, one or more transceivers 946, antennas 980, and a communications interface 948. The RU 940 communicates with the UE 104. The on-chip memory 912', 932', 942' and the additional memory modules 914, 934, 944 may each be considered a computer-readable medium/memory. Each computer-readable medium/memory may be non-transitory. Each of the processors 912, 932, 942 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 is configured to request, from each of one or more target nodes, a validity time for each of one or more candidate target SCG configurations for a UE; transition the UE to a RRC inactive state; and indicate the validity time for each of the one or more candidate target SCG configurations for each of the one or more target nodes. The component 199 may be within one or more processors of one or more of the CU 910, DU 930, and the RU 940. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 902 may include a variety of components configured for various functions. In one configuration, the network entity 902 includes means for requesting, from each of one or more target nodes, a validity time for each of one or more candidate target SCG configurations for a UE. The network entity includes means for transitioning the UE to a RRC inactive state. The network entity include means for indicating the validity time for each of the one or more candidate target SCG configurations for each of the one or more target nodes. The network entity further includes means for obtaining, from each of the one or more target nodes, the validity time for each of the one or more candidate target SCG configurations for the UE. The network entity further includes means for providing, to the UE, an RRC release indication. An indication comprising the validity time for each of the one or more candidate target SCG configurations for each of the one or more target nodes is within the RRC release. The network entity further includes means for providing a security counter associated with a respective one of the one or more candidate target SCG configurations that corresponds to a candidate target PSCell in response to a request to transition from the RRC inactive state to an RRC connected state. The network entity further includes means for obtaining an ID of the candidate target PSCell selected by the UE for operation in the RRC connected state. The network entity further includes means for obtaining a measurement report of one or more candidate target PSCells based on measurements performed while the UE is in the RRC inactive state. The network entity further includes means for providing an ID of the candidate target PSCell for operation in the RRC connected state based on the measurement report. The network entity further includes means for obtaining, from a second primary node in response to a first request to transition from the RRC inactive state to an RRC connected state, a second request for a UE context. The network entity further includes means for providing, to the second primary node, the UE context comprising at least one of a source secondary node ID, one or more target node IDs, and the validity times for each of the one or more candidate target SCG configurations associated with each of the one or more target nodes. The means may be the component 199 of the network entity 902 configured to perform the functions recited by the means. As described supra, the network entity 902 may include the TX processor 316, the RX processor 370, and the controller/processor 375. As such, in one configuration, the means may be the TX processor 316, the RX processor 370, and/or the controller/processor 375 configured to perform the functions recited by the means.

Figure 10:
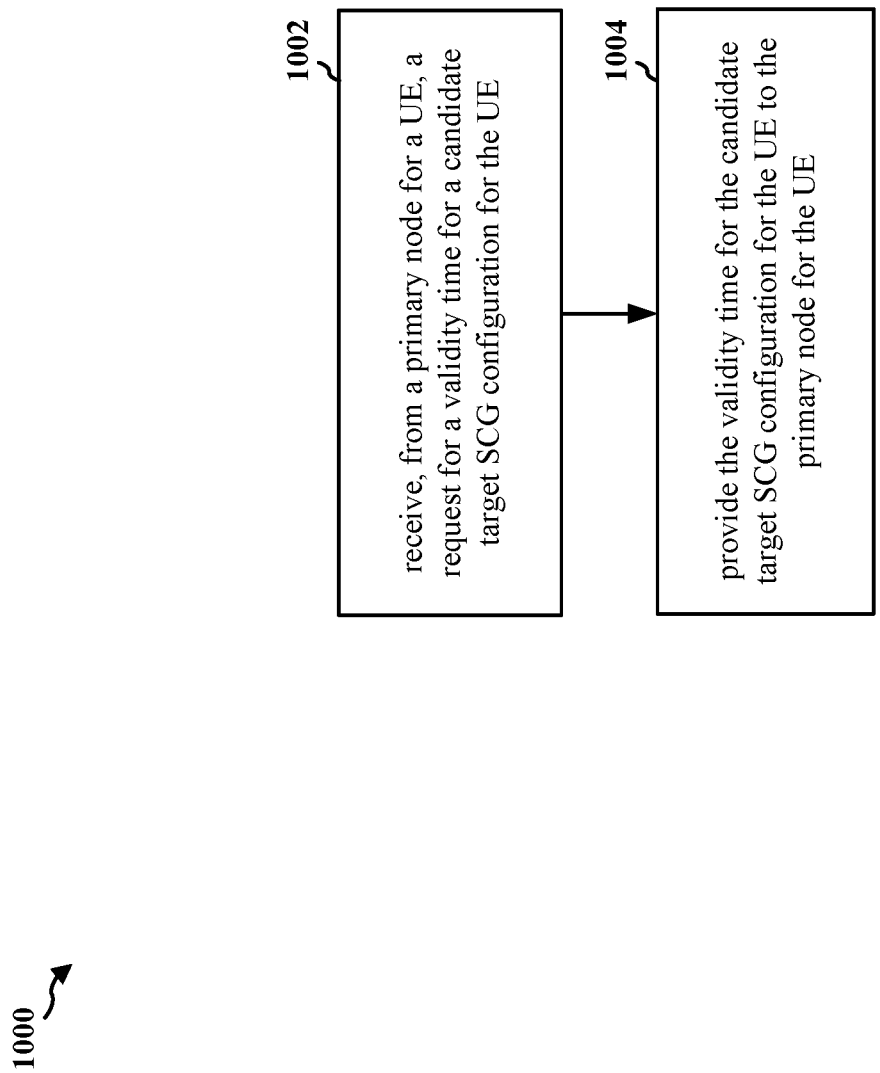
FIG. 10 is a flowchart of a method of wireless communication.

FIG. 10 is a flowchart 1000 of a method of wireless communication at a secondary node. The method may be performed by a base station (e.g., the base station 102*a*; the network entity 1102. One or more of the illustrated operations may be omitted, transposed, or contemporaneous. The method may allow a UE to resume DC operation in an efficient manner based on stored multiple SCG configurations at the UE while in an RRC inactive state.

At 1002, the secondary node may obtain a request for a validity time for a candidate target SCG configuration for a UE, as shown in connection with FIG. 4 or 5. For example, 1002 may be performed by validity component 197 of network entity 1102. The secondary node may obtain, from a primary node for a UE, the request for the validity time for the candidate target SCG configuration for the UE.

At 1004, the secondary node may provide the validity time for the candidate target SCG configuration for the UE, as shown in connection with FIG. 4 or 5. For example, 1004 may be performed by validity component 197 of network entity 1102. The secondary may provide the validity time for the candidate target SCG configuration for the UE to the primary node for the UE.

Figure 11:
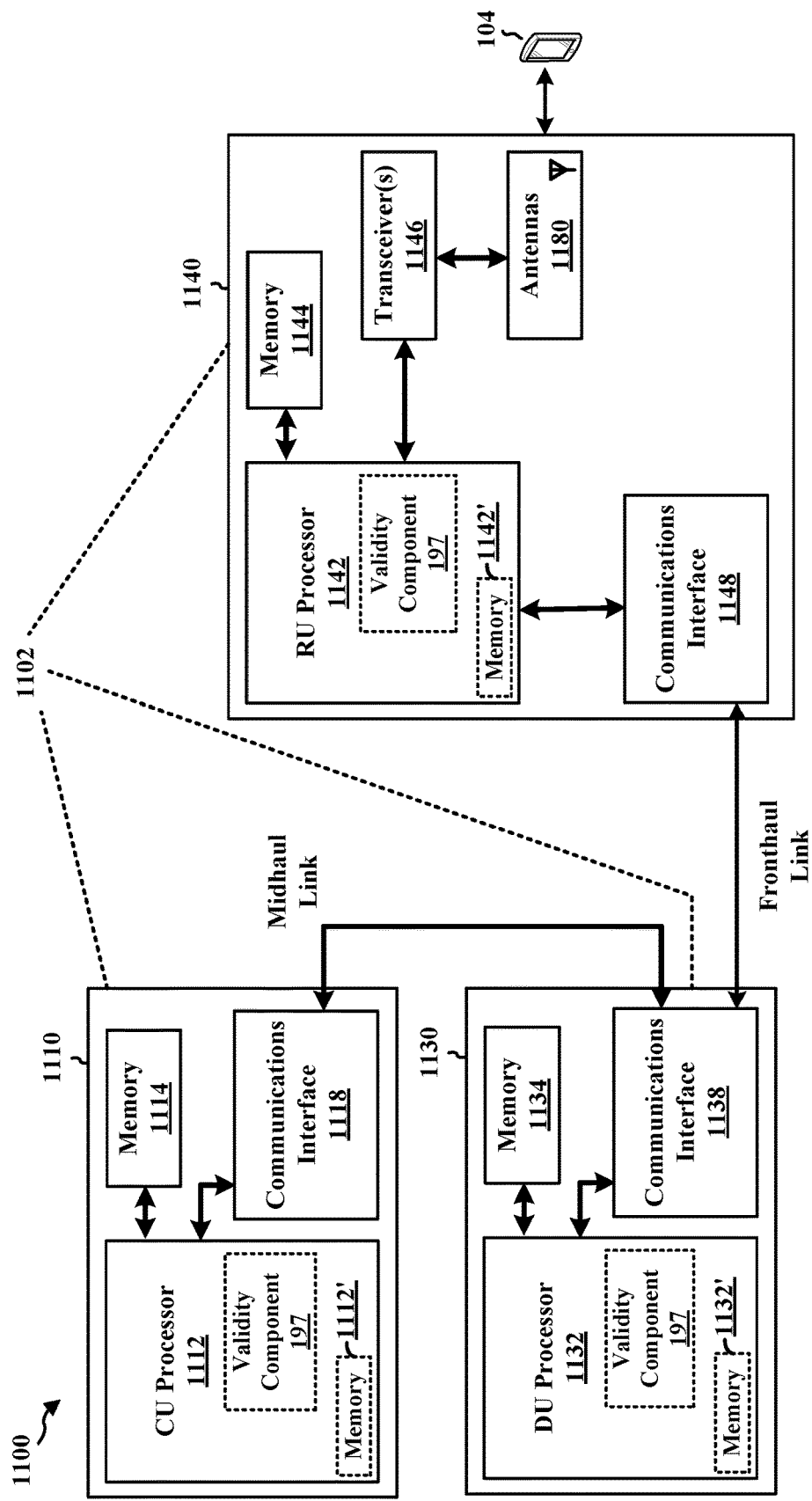
FIG. 11 is a diagram illustrating an example of a hardware implementation for an example network entity.

FIG. 11 is a diagram 1100 illustrating an example of a hardware implementation for a network entity 1102. The network entity 1102 may be a BS, a component of a BS, or may implement BS functionality. The network entity 1102 may include at least one of a CU 1110, a DU 1130, or an RU 1140. For example, depending on the layer functionality handled by the component 199, the network entity 1102 may include the CU 1110; both the CU 1110 and the DU 1130; each of the CU 1110, the DU 1130, and the RU 1140; the DU 1130; both the DU 1130 and the RU 1140; or the RU 1140. The CU 1110 may include a CU processor 1112. The CU processor 1112 may include on-chip memory 1112'. In some aspects, the CU 1110 may further include additional memory modules 1114 and a communications interface 1118. The CU 1110 communicates with the DU 1130 through a midhaul link, such as an F1 interface. The DU 1130 may include a DU processor 1132. The DU processor 1132 may include on-chip memory 1132'. In some aspects, the DU 1130 may further include additional memory modules 1134 and a communications interface 1138. The DU 1130 communicates with the RU 1140 through a fronthaul link. The RU 1140 may include an RU processor 1142. The RU processor 1142 may include on-chip memory 1142'. In some aspects, the RU 1140 may further include additional memory modules 1144, one or more transceivers 1146, antennas 1180, and a communications interface 1148. The RU 1140 communicates with the UE 104. The on-chip memory 1112', 1132', 1142' and the additional memory modules 1114, 1134, 1144 may each be considered a computer-readable medium/memory. Each computer-readable medium/memory may be non-transitory. Each of the processors 1112, 1132, 1142 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 is configured to obtain, from a primary node for a UE, a request for a validity time for a candidate target SCG configuration for the UE; and provide the validity time for the candidate target SCG configuration for the UE to the primary node for the UE. The component 199 may be within one or more processors of one or more of the CU 1110, DU 1130, and the RU 1140. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1102 may include a variety of components configured for various functions. In one configuration, the network entity 1102 includes means for receiving, from a primary node for a UE, a request for a validity time for a candidate target SCG configuration for the UE. The network entity includes means for providing the validity time for the candidate target SCG configuration for the UE to the primary node for the UE. The means may be the component 199 of the network entity 1102 configured to perform the functions recited by the means. As described supra, the network entity 1102 may include the TX processor 316, the RX processor 370, and the controller/processor 375. As such, in one configuration, the means may be the TX processor 316, the RX processor 370, and/or the controller/processor 375 configured to perform the functions recited by the means.

Figure 12:
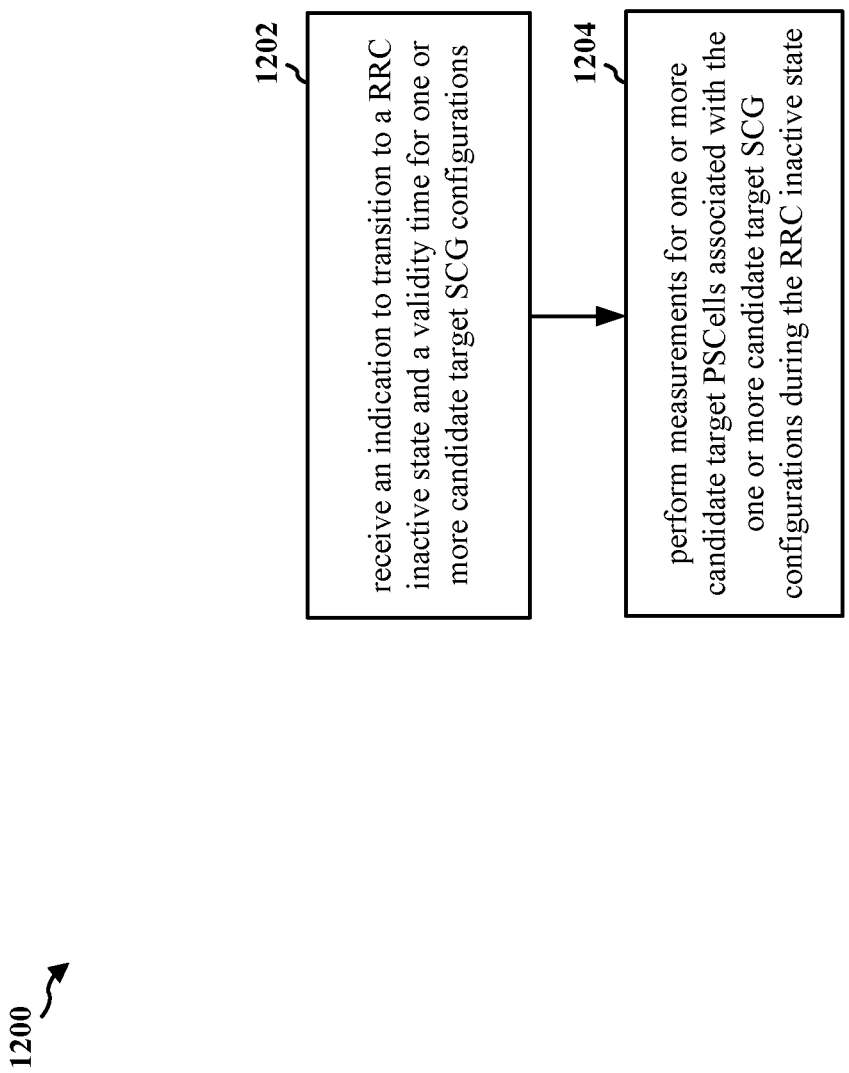
FIG. 12 is a flowchart of a method of wireless communication.

FIG. 12 is a flowchart 1200 of a method of wireless communication. The method may be performed by a UE (e.g., the UE 104; the apparatus 1404). One or more of the illustrated operations may be omitted, transposed, or contemporaneous. The method may configure a UE to store multiple SCG configurations while in an RRC inactive state to allow the UE to resume DC operation in an efficient manner based on one of the stored multiple SCG configurations.

At 1202, the UE may receive an indication to transition to a RRC inactive state and a validity time for each of one or more candidate target SCG configurations, as shown in connection with FIG. 4 or 5. For example, 1202 may be performed by validity component 198 of apparatus 1404. The UE may receive the indication to transition to the RRC inactive state and the validity time for each of the one or more candidate target SCG configurations from a primary node.

At 1204, the UE may perform measurements for one or more candidate target PSCells associated with the one or more candidate target SCG configurations, as shown in connection with FIG. 4 or 5. For example, 1204 may be performed by validity component 198 of apparatus 1404. The UE may perform measurements for the one or more candidate target PSCells associated with the one or more candidate target SCG configurations during the RRC inactive state. For example, the UE may measure the one or more candidate target PSCells associated with the one or more target SCG configurations while the UE is in the RRC inactive state.

Figure 13:
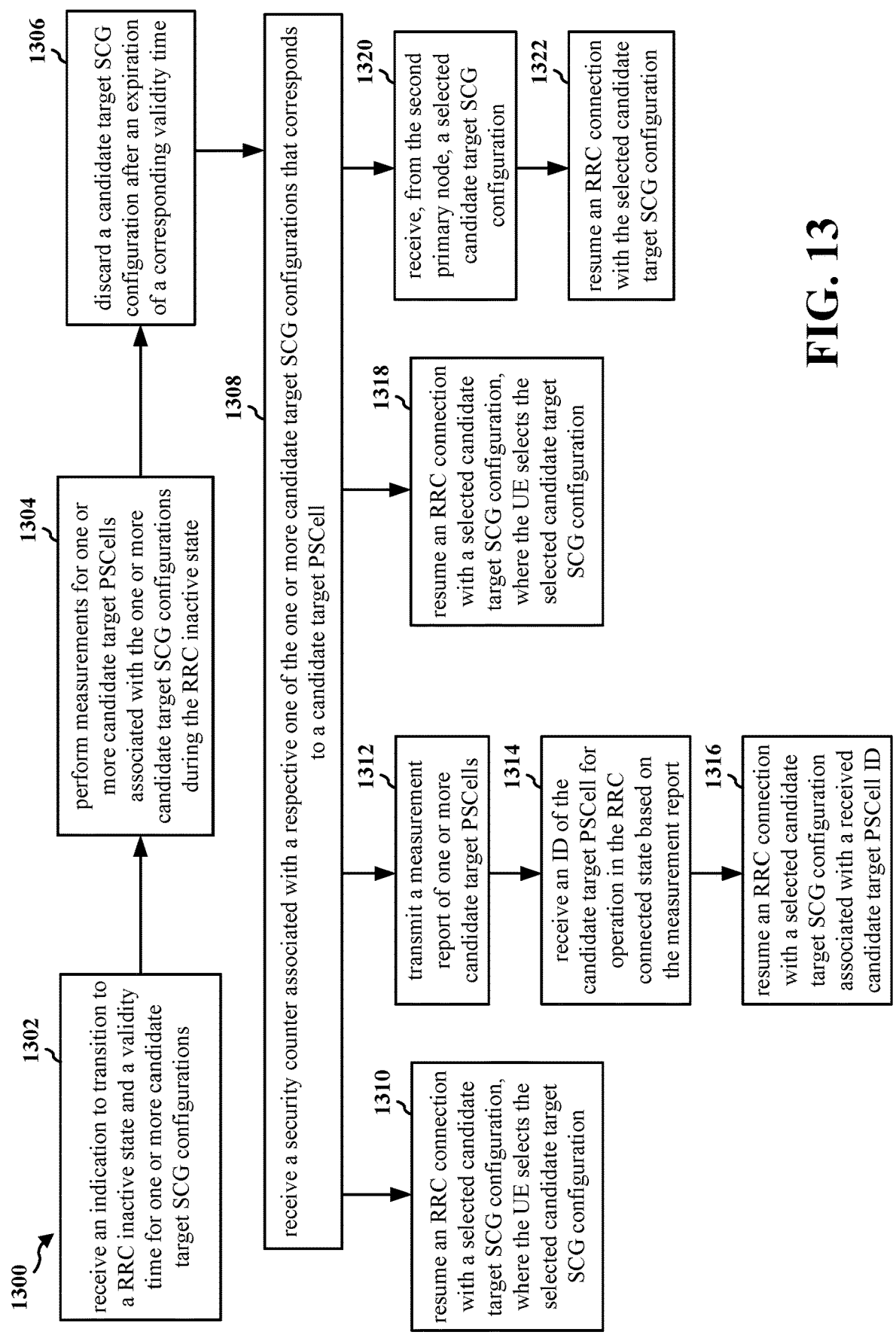
FIG. 13 is a flowchart of a method of wireless communication.

FIG. 13 is a flowchart 1300 of a method of wireless communication. The method may be performed by a UE (e.g., the UE 104; the apparatus 1404). One or more of the illustrated operations may be omitted, transposed, or contemporaneous. The method may configure a UE to store multiple SCG configurations while in an RRC inactive state to allow the UE to resume DC operation in an efficient manner based on one of the stored multiple SCG configurations.

At 1302, the UE may receive an indication to transition to a RRC inactive state and a validity time for each of one or more candidate target SCG configurations, as shown in connection with FIG. 4 or 5. For example, 1302 may be performed by validity component 198 of apparatus 1404. The UE may receive the indication to transition to the RRC inactive state and the validity time for each of the one or more candidate target SCG configurations from a primary node.

At 1304, the UE may perform measurements for one or more candidate target PSCells associated with the one or more candidate target SCG configurations, as shown in connection with FIG. 4 or 5. For example, 1304 may be performed by validity component 198 of apparatus 1404. The UE may perform measurements for the one or more candidate target PSCells associated with the one or more candidate target SCG configurations during the RRC inactive state. For example, the UE may measure the one or more candidate target PSCells associated with the one or more target SCG configurations while the UE is in the RRC inactive state.

At 1306, the UE may discard a candidate target SCG configuration, as shown in connection with FIG. 4 or 5. For example, 1306 may be performed by validity component 198 of apparatus 1404. The UE may maintain the candidate target SCG configurations for the duration of the corresponding validity time and then discard the candidate target SCG configuration after an expiration of a corresponding validity time.

At 1308, the UE may receive a security counter associated with a respective one of the one or more candidate target SCG configurations, as shown in connection with FIG. 4, 6A, or 6B. For example, 1308 may be performed by validity component 198 of apparatus 1404. The UE may receive the security counter associated with the respective one of the one or more candidate target SCG configurations that corresponds to a candidate target PSCell. The UE may receive the security counter associated with the respective one of the one or more candidate target SCG configurations that corresponds to a candidate target PSCell in response to transmission of a request to transition from the RRC inactive state to an RRC connected state. In some aspects, the security counter may be provided within a RRC resume indication to transition the UE from the RRC inactive state to the RRC connected state. The UE may receive the RRC resume indication from the primary node.

At 1310, the UE may resume an RRC connection with a selected candidate target SCG configuration, as shown in connection with FIG. 4. For example, 1310 may be performed by validity component 198 of apparatus 1404. The UE may resume the RRC connection with the selected candidate target SCG configuration from a set of the one or more candidate target SCG configurations for which the validity time has not expired. The UE may select the selected candidate target SCG configuration.

At 1312, the UE may transmit a measurement report of one or more candidate target PSCells, as shown in connection with FIG. 4. For example, 1312 may be performed by validity component 198 of apparatus 1404. The UE may transmit the measurement report of the one or more candidate target PSCells based on measurements performed while the UE is in the RRC inactive state. The UE may transmit the measurement report to the primary node.

At 1314, the UE may receive an ID of the candidate target PSCell for operation in the RRC connected state, as shown in connection with FIG. 4. For example, 1314 may be performed by validity component 198 of apparatus 1404. The UE may receive the ID of the candidate target PSCell for operation in the RRC connected state based on the measurement report provided to the primary node.

At 1316, the UE may resume an RRC connection with a selected candidate target SCG configuration, as shown in connection with FIG. 4. For example, 1316 may be performed by validity component 198 of apparatus 1404. The UE may resume the RRC connection with the selected candidate target SCG configuration associated with a received candidate target PSCell ID, from a set of the one or more candidate target SCG configurations for which the validity time has not expired. In such instances, the primary node may select the candidate target PSCell for operation in the RRC connected state based on the measurement report.

At 1318, the UE may resume an RRC connection with a selected candidate target SCG configuration, as shown in connection with FIG. 6A. For example, 1318 may be performed by validity component 198 of apparatus 1404. The UE may resume the RRC connection with the selected candidate target SCG configuration from a set of the one or more candidate target SCG configurations for which the validity time has not expired. In such instances, the UE may select the selected candidate target SCG configuration. For example, the UE may select the selected candidate target SCG configuration based on the measurements obtained while the UE is in the RRC inactive state. In some aspects, a request to transition from the RRC inactive state to the RRC connected state may be transmitted to a second primary node, instead of the primary node. The UE may transmit the request to transition to the RRC connected state to the second primary node due to the second primary node having a greater signal strength than the primary node. The UE may receive the security counter from the second primary node in response to transmitting the request to transition from the RRC inactive state to the RRC connected state. In some aspects, a selected candidate target PSCell associated with the candidate target SCG configuration is selected by the UE and is provided to the second primary node.

At 1320, the UE may receive a selected candidate target SCG configuration, as shown in connection with FIG. 6B. For example, 1320 may be performed by validity component 198 of apparatus 1404. The UE may receive, from the second primary node, the selected candidate target SCG configuration, from a set of the one or more candidate target SCG configurations for which the validity time has not expired.

At 1322, the UE may resume an RRC connection, as shown in connection with FIG. 6B. For example, 1322 may be performed by validity component 198 of apparatus 1404. The UE may resume the RRC connection with the selected candidate target SCG configuration. In some aspects, a request to transition from the RRC inactive state to the RRC connected state may be transmitted to a second primary node, instead of the primary node. In such aspects, the security counter may be received from the second primary node.

FIG. 14 is a diagram 1400 illustrating an example of a hardware implementation for an apparatus 1404. The apparatus 1404 may be a UE, a component of a UE, or may implement UE functionality. In some aspects, the apparatus 1404 may include a cellular baseband processor 1424 (also referred to as a modem) coupled to one or more transceivers 1422 (e.g., cellular RF transceiver). The cellular baseband processor 1424 may include on-chip memory 1424'. In some aspects, the apparatus 1404 may further include one or more subscriber identity modules (SIM) cards 1420 and an application processor 1406 coupled to a secure digital (SD) card 1408 and a screen 1410. The application processor 1406 may include on-chip memory 1406'. In some aspects, the apparatus 1404 may further include a Bluetooth module 1412, a WLAN module 1414, an SPS module 1416 (e.g., GNSS module), one or more sensor modules 1418 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1426, a power supply 1430, and/or a camera 1432. The Bluetooth module 1412, the WLAN module 1414, and the SPS module 1416 may include an on-chip transceiver (TRX) (or in some cases, just a receiver (RX)). The Bluetooth module 1412, the WLAN module 1414, and the SPS module 1416 may include their own dedicated antennas and/or utilize the antennas 1480 for communication. The cellular baseband processor 1424 communicates through the transceiver(s) 1422 via one or more antennas 1480 with the UE 104 and/or with an RU associated with a network entity 1402. The cellular baseband processor 1424 and the application processor 1406 may each include a computer-readable medium/memory 1424', 1406', respectively. The additional memory modules 1426 may also be considered a computer-readable medium/memory. Each computer-readable medium/memory 1424', 1406', 1426 may be non-transitory. The cellular baseband processor 1424 and the application processor 1406 are each responsible for general processing, including the execution of software stored on the computer-readable medium/memory. The software, when executed by the cellular baseband processor 1424/application processor 1406, causes the cellular baseband processor 1424/application processor 1406 to perform the various functions described supra. The computer-readable medium/memory may also be used for storing data that is manipulated by the cellular baseband processor 1424/application processor 1406 when executing software. The cellular baseband processor 1424/application processor 1406 may be a component of the UE 350 and may include the memory 360 and/or at least one of the TX processor 368, the RX processor 356, and the controller/processor 359. In one configuration, the apparatus 1404 may be a processor chip (modem and/or application) and include just the cellular baseband processor 1424 and/or the application processor 1406, and in another configuration, the apparatus 1404 may be the entire UE (e.g., see 350 of FIG. 3) and include the additional modules of the apparatus 1404.

As discussed supra, the component 198 is configured to receive an indication to transition to a RRC inactive state and a validity time for each of one or more candidate target SCG configurations; and perform measurements for one or more candidate target PSCells associated with the one or more candidate target SCG configurations during the RRC inactive state. The component 198 may be within the cellular baseband processor 1424, the application processor 1406, or both the cellular baseband processor 1424 and the application processor 1406. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1404 may include a variety of components configured for various functions. In one configuration, the apparatus 1404, and in particular the cellular baseband processor 1424 and/or the application processor 1406, includes means for receiving an indication to transition to a RRC inactive state and a validity time for each of one or more candidate target SCG configurations. The apparatus includes means for performing measurements for one or more candidate target PSCells associated with the one or more candidate target SCG configurations during the RRC inactive state. The apparatus further includes means for discarding a candidate target SCG configuration after an expiration of a corresponding validity time. The apparatus further includes means for receiving a security counter associated with a respective one of the one or more candidate target SCG configurations that corresponds to a candidate target PSCell in response to transmission of a request to transition from the RRC inactive state to an RRC connected state. The apparatus further includes means for resuming an RRC connection with a selected candidate target SCG configuration, from a set of the one or more candidate target SCG configurations for which the validity time has not expired, wherein the UE selects the selected candidate target SCG configuration. The apparatus further includes means for transmitting a measurement report of one or more candidate target PSCells based on measurements performed while the UE is in the RRC inactive state. The apparatus further includes means for receiving an ID of the candidate target PSCell for operation in the RRC connected state based on the measurement report. The apparatus further includes means for resuming an RRC connection with a selected candidate target SCG configuration associated with a received candidate target PSCell ID, from a set of the one or more candidate target SCG configurations for which the validity time has not expired. The apparatus further includes means for resuming an RRC connection with a selected candidate target SCG configuration, from a set of the one or more candidate target SCG configurations for which the validity time has not expired, wherein the UE selects the selected candidate target SCG configuration. The apparatus further includes means for receiving, from the second primary node, a selected candidate target SCG configuration, from a set of the one or more candidate target SCG configurations for which the validity time has not expired. The apparatus further includes means for resuming an RRC connection with the selected candidate target SCG configuration. The means may be the component 198 of the apparatus 1404 configured to perform the functions recited by the means. As described supra, the apparatus 1404 may include the TX processor 368, the RX processor 356, and the controller/processor 359. As such, in one configuration, the means may be the TX processor 368, the RX processor 356, and/or the controller/processor 359 configured to perform the functions recited by the means.

Aspects presented herein provide a configuration for a UE configured to store multiple SCG configurations while in an RRC inactive state. At least one advantage of the UE storing multiple SCG configurations is that that upon resumption of the connection with the network, the UE may resume the DC operation in an efficient manner utilizing one of the stored SCG configurations. A primary node may provide the UE the validity time for each of the one or more candidate target SCG configurations for each of the one or more target nodes. The UE, while in a RRC inactive state, may maintain one or more candidate target SCG configurations until the corresponding validity time has expired. The UE storing the one or more candidate target SCG configurations while in the RRC inactive state may allow the UE to resume the connection with a secondary node based on the one or more candidate target SCG configurations.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a primary node comprising requesting, from each of one or more target nodes, a validity time for each of one or more candidate target SCG configurations for a UE; transitioning the UE to a RRC inactive state; and indicating, to the UE, the validity time for each of the one or more candidate target SCG configurations for each of the one or more target nodes.

Aspect 2 is the method of aspect 1, further including obtaining, from each of the one or more target nodes, the validity time for each of the one or more candidate target SCG configurations for the UE.

Aspect 3 is the method of any of aspects 1 and 2, further includes that the transitioning the UE to the RRC inactive state further including providing, to the UE, an RRC release indication, wherein an indication comprising the validity time for each of the one or more candidate target SCG configurations for each of the one or more target nodes is within the RRC release indication.

Aspect 4 is the method of any of aspects 1-3, further includes that the RRC release indication further comprises instructions to measure one or more candidate target PSCells associated with the one or more candidate target SCG configurations during the RRC inactive state.

Aspect 5 is the method of any of aspects 1-4, further including provide a security counter associated with a respective one of the one or more candidate target SCG configurations that corresponds to a candidate target PSCell in response to a request to transition from the RRC inactive state to an RRC connected state.

Aspect 6 is the method of any of aspects 1-5, further includes that the security counter is provided within a RRC resume indication to transition the UE from the RRC inactive state to the RRC connected state.

Aspect 7 is the method of any of aspects 1-6, further including obtaining an ID of the candidate target PSCell selected by the UE for operation in the RRC connected state.

Aspect 8 is the method of any of aspects 1-7, further including obtaining a measurement report of one or more candidate target PSCells based on measurements performed while the UE is in the RRC inactive state; and providing an ID of the candidate target PSCell for operation in the RRC connected state based on the measurement report.

Aspect 9 is the method of any of aspects 1-8, further including obtaining, from a second primary node in response to a first request to transition from the RRC inactive state to an RRC connected state, a second request for a UE context; and providing, to the second primary node, the UE context comprising at least one of a source secondary node ID, one or more target node IDs, and the validity times for each of the one or more candidate target SCG configurations associated with each of the one or more target nodes.

Aspect 10 is the method of any of aspects 1-9, further includes that the primary node is a last serving node and the UE requests to resume a connection with the second primary node.

Aspect 11 is an apparatus for wireless communication at a primary node including at least one processor coupled to a memory and at least one transceiver, the at least one processor configured to implement any of Aspects 1-10.

Aspect 12 is an apparatus for wireless communication at a primary node including means for implementing any of Aspects 1-10.

Aspect 13 is a computer-readable medium storing computer executable code, where the code when executed by a processor causes the processor to implement any of Aspects 1-10.

Aspect 14 is a method of wireless communication at a secondary node comprising receiving, from a primary node for a UE, a request for a validity time for a candidate target SCG configuration for the UE; and providing the validity time for the candidate target SCG configuration for the UE to the primary node for the UE.

Aspect 15 is an apparatus for wireless communication at a primary node including at least one processor coupled to a memory and at least one transceiver, the at least one processor configured to implement Aspect 14.

Aspect 16 is an apparatus for wireless communication at a primary node including means for implementing Aspect 14.

Aspect 17 is a computer-readable medium storing computer executable code, where the code when executed by a processor causes the processor to implement Aspect 14.

Aspect 18 is a method of wireless communication at a UE comprising receiving an indication to transition to a RRC inactive state and a validity time for one or more candidate target SCG configurations; and performing measurements for one or more candidate target PSCells associated with the one or more candidate target SCG configurations during the RRC inactive state.

Aspect 19 is the method of aspect 18, further including discarding a candidate target SCG configuration after an expiration of a corresponding validity time.

Aspect 20 is the method of any of aspects 18 and 19, further including receiving a security counter associated with a respective one of the one or more candidate target SCG configurations that corresponds to a candidate target PSCell in response to transmission of a request to transition from the RRC inactive state to an RRC connected state.

Aspect 21 is the method of any of aspects 18-20, further including resuming an RRC connection with a selected candidate target SCG configuration, from a set of the one or more candidate target SCG configurations for which the validity time has not expired, wherein the UE selects the selected candidate target SCG configuration.

Aspect 22 is the method of any of aspects 18-21, further includes that the security counter is provided within a RRC resume indication to transition the UE from the RRC inactive state to the RRC connected state.

Aspect 23 is the method of any of aspects 18-22, further including transmitting a measurement report of one or more candidate target PSCells based on the measurements performed while the UE is in the RRC inactive state; receiving an ID of the candidate target PSCell for operation in the RRC connected state based on the measurement report; and resuming an RRC connection with a selected candidate target SCG configuration associated with a received candidate target PSCell ID, from a set of the one or more candidate target SCG configurations for which the validity time has not expired.

Aspect 24 is the method of any of aspects 18-23, further includes that the request to transition from the RRC inactive state to the RRC connected state is transmitted to a second primary node, wherein the security counter is received from the second primary node, further including resuming an RRC connection with a selected candidate target SCG configuration, from a set of the one or more candidate target SCG configurations for which the validity time has not expired, wherein the UE selects the selected candidate target SCG configuration.

Aspect 25 is the method of any of aspects 18-24, further includes that a selected candidate target PSCell associated with the candidate target SCG configuration is selected by the UE and is provided to the second primary node.

Aspect 26 is the method of any of aspects 18-25, further includes that the request to transition from the RRC inactive state to the RRC connected state is transmitted to a second primary node, wherein the security counter is received from the second primary node, further including receiving, from the second primary node, a selected candidate target SCG configuration, from a set of the one or more candidate target SCG configurations for which the validity time has not expired; and resuming an RRC connection with the selected candidate target SCG configuration.

Aspect 27 is an apparatus for wireless communication at a UE including at least one processor coupled to a memory and at least one transceiver, the at least one processor configured to implement any of Aspects 18-26.

Aspect 28 is an apparatus for wireless communication at a UE including means for implementing any of Aspects 18-26.

Aspect 29 is a computer-readable medium storing computer executable code, where the code when executed by a processor causes the processor to implement any of Aspects 18-26.

What is claimed is:

1. An apparatus for wireless communication at a primary node, comprising:
    a memory; and
    at least one processor coupled to the memory and, based at least in part on information stored in the memory, the at least one processor is configured to:
        request, from each of one or more target nodes, a validity time for each of one or more candidate target secondary cell group (SCG) configurations for a user equipment (UE);
        transition the UE to a radio resource control (RRC) inactive state;
        indicate, to the UE, the validity time for each of the one or more candidate target SCG configurations for each of the one or more target nodes; and
        provide a security counter associated with a respective one of the one or more candidate target SCG configurations that corresponds to a candidate target primary secondary cell (PSCell) in response to a request to transition from the RRC inactive state to an RRC connected state.

2. The apparatus of claim 1, further comprising a transceiver coupled to the at least one processor.

3. The apparatus of claim 1, wherein the at least one processor is configured to:
    obtain, from each of the one or more target nodes, the validity time for each of the one or more candidate target SCG configurations for the UE.

4. The apparatus of claim 1, wherein to transition the UE to the RRC inactive state the at least one processor is configured to:
    provide, to the UE, an RRC release indication, wherein an indication comprising the validity time for each of the one or more candidate target SCG configurations for each of the one or more target nodes is within the RRC release indication.

5. The apparatus of claim 4, wherein the RRC release indication further comprises instructions to measure one or more candidate target primary secondary cells (PSCells) associated with the one or more candidate target SCG configurations during the RRC inactive state.

6. The apparatus of claim 1, wherein the security counter is provided within a RRC resume indication to transition the UE from the RRC inactive state to the RRC connected state.

7. The apparatus of claim 1, wherein the at least one processor is configured to:
    obtain an identifier (ID) of the candidate target PSCell selected by the UE for operation in the RRC connected state.

8. The apparatus of claim 1, wherein the at least one processor is configured to:
    obtain a measurement report of one or more candidate target PSCells based on measurements performed while the UE is in the RRC inactive state; and
    provide an identifier (ID) of the candidate target PSCell for operation in the RRC connected state based on the measurement report.

9. An apparatus for wireless communication at a primary node, comprising:
    a memory; and
    at least one processor coupled to the memory, and based at least in part on information stored in the memory, the at least one processor is configured to:
        request, from each of one or more target nodes, a validity time for each of one or more candidate target secondary cell group (SCG) configurations for a user equipment (UE);
        transition the UE to a radio resource control (RRC) inactive state;
        indicate, to the UE, the validity time for each of the one or more candidate target SCG configurations for each of the one or more target nodes;
        obtain, from a second primary node in response to a first request to transition from the RRC inactive state to an RRC connected state, a second request for a UE context; and
        provide, to the second primary node, the UE context comprising at least one of a source secondary node identifier (ID), one or more target node IDs, and the validity times for each of the one or more candidate target SCG configurations associated with each of the one or more target nodes, wherein the primary node is a last serving node and the UE requests to resume a connection with the second primary node.

10. The apparatus of claim 9, wherein the primary node is a last serving node and the UE requests to resume a connection with the second primary node.

11. A method of wireless communication at a primary node, comprising:
    requesting, from each of one or more target nodes, a validity time for each of one or more candidate target secondary cell group (SCG) configurations for a user equipment (UE);
    transitioning the UE to a radio resource control (RRC) inactive state; and
    indicating, to the UE, the validity time for each of the one or more candidate target SCG configurations for each of the one or more target nodes; and
    providing a security counter associated with a respective one of the one or more candidate target SCG configurations that corresponds to a candidate target primary secondary cell (PSCell) in response to a request to transition from the RRC inactive state to an RRC connected state.

12. The method of claim 11, further comprising:
    obtaining, from each of the one or more target nodes, the validity time for each of the one or more candidate target SCG configurations for the UE.

13. The method of claim 11, wherein the transitioning the UE to the RRC inactive state further comprising:
    providing, to the UE, an RRC release indication, wherein an indication comprising the validity time for each of the one or more candidate target SCG configurations for each of the one or more target nodes is within the RRC release indication.

14. The method of claim 13, wherein the RRC release indication further comprises instructions to measure one or more candidate target primary secondary cells (PSCells) associated with the one or more candidate target SCG configurations during the RRC inactive state.

15. The method of claim 11, wherein the security counter is provided within a RRC resume indication to transition the UE from the RRC inactive state to the RRC connected state.

16. The method of claim 11, further comprising:
obtaining an identifier (ID) of the candidate target PSCell selected by the UE for operation in the RRC connected state.

17. The method of claim 11, further comprising:
obtaining a measurement report of one or more candidate target PSCells based on measurements performed while the UE is in the RRC inactive state; and
providing an identifier (ID) of the candidate target PSCell for operation in the RRC connected state based on the measurement report.

18. A method of wireless communication at a primary node, comprising:
requesting, from each of one or more target nodes, a validity time for each of one or more candidate target secondary cell group (SCG) configurations for a user equipment (UE);
transitioning the UE to a radio resource control (RRC) inactive state; and
indicating, to the UE, the validity time for each of the one or more candidate target SCG configurations for each of the one or more target nodes;
obtaining, from a second primary node in response to a first request to transition from the RRC inactive state to an RRC connected state, a second request for a UE context; and
providing, to the second primary node, the UE context comprising at least one of a source secondary node identifier (ID), one or more target node IDs, and the validity times for each of the one or more candidate target SCG configurations associated with each of the one or more target nodes, wherein the primary node is a last serving node and the UE requests to resume a connection with the second primary node.

19. An apparatus for wireless communication at a user equipment (UE), comprising:
a memory; and
at least one processor coupled to the memory and, based at least in part on information stored in the memory, the at least one processor is configured to:
receive an indication to transition to a radio resource control (RRC) inactive state and a validity time for one or more candidate target secondary cell group (SCG) configurations; and
perform measurements for one or more candidate target primary secondary cells (PSCells) associated with the one or more candidate target SCG configurations during the RRC inactive state; and
receive a security counter associated with a respective one of the one or more candidate target SCG configurations that corresponds to a candidate target primary secondary cell (PSCell) in response to transmission of a request to transition from the RRC inactive state to an RRC connected state.

20. The apparatus of claim 19, further comprising a transceiver coupled to the at least one processor.

21. The apparatus of claim 19, wherein the at least one processor is configured to:
discard a candidate target SCG configuration after an expiration of a corresponding validity time.

22. The apparatus of claim 19, wherein the at least one processor is configured to:
resume an RRC connection with a selected candidate target SCG configuration, from a set of the one or more candidate target SCG configurations for which the validity time has not expired, wherein the UE selects the selected candidate target SCG configuration.

23. The apparatus of claim 19, wherein the security counter is provided within a RRC resume indication to transition the UE from the RRC inactive state to the RRC connected state.

24. The apparatus of claim 19, wherein the at least one processor is configured to:
transmit a measurement report of one or more candidate target PSCells based on the measurements performed while the UE is in the RRC inactive state;
receive an identifier (ID) of the candidate target PSCell for operation in the RRC connected state based on the measurement report; and
resume an RRC connection with a selected candidate target SCG configuration associated with a received candidate target PSCell ID, from a set of the one or more candidate target SCG configurations for which the validity time has not expired.

25. The apparatus of claim 19, wherein the request to transition from the RRC inactive state to the RRC connected state is transmitted to a second primary node, wherein the security counter is received from the second primary node, wherein the at least one processor is configured to:
resume an RRC connection with a selected candidate target SCG configuration, from a set of the one or more candidate target SCG configurations for which the validity time has not expired, wherein the UE selects the selected candidate target SCG configuration.

26. The apparatus of claim 25, wherein a selected candidate target PSCell associated with the candidate target SCG configuration is selected by the UE and is provided to the second primary node.

27. The apparatus of claim 19, wherein the request to transition from the RRC inactive state to the RRC connected state is transmitted to a second primary node, wherein the security counter is received from the second primary node, wherein the at least one processor is configured to:
receive, from the second primary node, a selected candidate target SCG configuration, from a set of the one or more candidate target SCG configurations for which the validity time has not expired; and
resume an RRC connection with the selected candidate target SCG configuration.

* * * * *